United States Patent
Imhof et al.

(10) Patent No.: US 9,194,968 B2
(45) Date of Patent: Nov. 24, 2015

(54) METHOD FOR SEISMIC HYDROCARBON SYSTEM ANALYSIS

(75) Inventors: Matthias G. Imhof, Katy, TX (US);
Pavel Dimitrov, Houston, TX (US);
Kelly Wrobel, Houston, TX (US);
Krishnan Kumaran, Raritan, NJ (US);
Martin J. Terrell, Spring, TX (US);
Stefan Hussenoeder, Sugar Land, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 457 days.

(21) Appl. No.: 13/695,226

(22) PCT Filed: Apr. 22, 2011

(86) PCT No.: PCT/US2011/033519
§ 371 (c)(1),
(2), (4) Date: Oct. 29, 2012

(87) PCT Pub. No.: WO2011/149609
PCT Pub. Date: Dec. 1, 2011

(65) Prior Publication Data
US 2013/0064040 A1    Mar. 14, 2013

Related U.S. Application Data

(60) Provisional application No. 61/349,534, filed on May 28, 2010.

(51) Int. Cl.
*G01V 1/30*    (2006.01)

(52) U.S. Cl.
CPC . *G01V 1/30* (2013.01); *G01V 1/306* (2013.01)

(58) Field of Classification Search
CPC ......... G01V 1/30; G01V 1/306; G01V 1/301; G01V 1/288; G01V 11/00
USPC ............... 166/250.01, 369; 267/43, 53, 73; 702/11, 14, 179
See application file for complete search history.

(56) References Cited

U.S. PATENT DOCUMENTS

| 4,916,615 A | 4/1990 | Chittineni |
|---|---|---|
| 4,992,995 A | 2/1991 | Favret |

(Continued)

FOREIGN PATENT DOCUMENTS

| EP | 1 110 103 | 3/2007 |
|---|---|---|
| WO | WO 97/22077 | 6/1997 |

(Continued)

OTHER PUBLICATIONS

Biddle, K.T. et al. (1994), "Hydrocarbon Traps", *The Petroleum System—From Source to Trap*, AAPG Memoir 60, pp. 219-235.

(Continued)

*Primary Examiner* — Daniel L Murphy
(74) *Attorney, Agent, or Firm* — ExxonMobil Upstream Research Company, Law Dept.

(57) ABSTRACT

Method for analyzing seismic data representing a subsurface region for presence of a hydrocarbon system or a particular play. Seismic attributes are computed, the attributes being selected to relate to the classical elements of a hydrocarbon system, namely reservoir, seal, trap, source, maturation, and migration. Preferably, the attributes are computed along structural fabrics (1) of the subsurface region, and are smoothed over at least tens or hundreds of data voxels. The resulting geologic attributes (2) are used to analyze the data for elements of the hydrocarbon system and/or recognition of specific plays, and for ranking and annotating partitioned regions (3) of the data volume based on size, quality, and confidence in the prospectivity prediction (5). A catalog (8) of hydrocarbon trap configurations may be created and used to identify potential presence of hydrocarbon traps and/or aid in scoring (4) and ranking partitioned regions as hydrocarbon prospects.

20 Claims, 11 Drawing Sheets

(56) References Cited

U.S. PATENT DOCUMENTS

| | | | |
|---|---|---|---|
| 5,047,991 A | 9/1991 | Hsu | |
| 5,265,192 A | 11/1993 | McCormack | |
| 5,274,714 A | 12/1993 | Hutcheson et al. | |
| 5,416,750 A | 5/1995 | Doyen et al. | |
| 5,444,619 A | 8/1995 | Hoskins et al. | |
| 5,465,308 A | 11/1995 | Hutcheson et al. | |
| 5,475,589 A | 12/1995 | Armitage | |
| 5,539,704 A | 7/1996 | Doyen et al. | |
| 5,586,082 A | 12/1996 | Anderson et al. | |
| 5,646,342 A | 7/1997 | Hagenes | |
| 5,671,136 A | 9/1997 | Willhoit, Jr. | |
| 5,852,588 A | 12/1998 | de Hoop et al. | |
| 5,940,777 A | 8/1999 | Keskes | |
| 5,940,778 A | 8/1999 | Marfurt et al. | |
| 6,052,650 A | 4/2000 | Assa et al. | |
| 6,226,596 B1 | 5/2001 | Gao | |
| 6,236,942 B1 | 5/2001 | Bush | |
| 6,295,504 B1 | 9/2001 | Ye et al. | |
| 6,363,327 B1 | 3/2002 | Wallet et al. | |
| 6,401,042 B1 | 6/2002 | Van Riel et al. | |
| 6,411,903 B2 | 6/2002 | Bush | |
| 6,438,493 B1 | 8/2002 | West et al. | |
| 6,466,923 B1 | 10/2002 | Young | |
| 6,473,696 B1 | 10/2002 | Onyia et al. | |
| 6,498,989 B1 | 12/2002 | Pisetski et al. | |
| 6,516,274 B2 | 2/2003 | Cheng et al. | |
| 6,574,566 B2 | 6/2003 | Grismore et al. | |
| 6,618,678 B1 | 9/2003 | Van Riel | |
| 6,625,541 B1 | 9/2003 | Shenoy et al. | |
| 6,725,163 B1 | 4/2004 | Trappe et al. | |
| 6,725,174 B2 | 4/2004 | Bouts et al. | |
| 6,735,526 B1 | 5/2004 | Meldahl et al. | |
| 6,757,614 B2 | 6/2004 | Pepper et al. | |
| 6,771,800 B2 | 8/2004 | Keskes et al. | |
| 6,804,609 B1 | 10/2004 | Brumbaugh | |
| 6,840,845 B2 | 1/2005 | Numoto | |
| 6,847,895 B2 | 1/2005 | Nivlet et al. | |
| 6,850,864 B2 | 2/2005 | Gillard et al. | |
| 6,853,922 B2 | 2/2005 | Stark | |
| 6,950,786 B1 | 9/2005 | Sonneland et al. | |
| 6,957,146 B1 | 10/2005 | Taner et al. | |
| 6,970,397 B2 | 11/2005 | Castagna et al. | |
| 6,988,038 B2 | 1/2006 | Trappe et al. | |
| 7,162,463 B1 | 1/2007 | Wentland et al. | |
| 7,184,991 B1 | 2/2007 | Wentland et al. | |
| 7,188,092 B2 | 3/2007 | Wentland et al. | |
| 7,197,444 B2 | 3/2007 | Bomar, Jr. et al. | |
| 7,203,342 B2 | 4/2007 | Pedersen | |
| 7,222,023 B2 | 5/2007 | Laurent et al. | |
| 7,243,029 B2 | 7/2007 | Lichman et al. | |
| 7,248,258 B2 | 7/2007 | Acosta et al. | |
| 7,248,539 B2 | 7/2007 | Borgos et al. | |
| 7,295,706 B2 | 11/2007 | Wentland et al. | |
| 7,295,930 B2 | 11/2007 | Dulac et al. | |
| 7,308,139 B2 | 12/2007 | Wentland et al. | |
| 7,424,367 B2 | 9/2008 | Saltzer et al. | |
| 7,453,767 B1 | 11/2008 | Padgett | |
| 7,454,292 B2 | 11/2008 | Wang et al. | |
| 7,463,552 B1 | 12/2008 | Padgett | |
| 8,027,517 B2 | 9/2011 | Gauthier et al. | |
| 8,150,669 B2 | 4/2012 | Cacas et al. | |
| 8,358,561 B2 | 1/2013 | Kelly et al. | |
| 8,363,959 B2 | 1/2013 | Boiman et al. | |
| 8,385,603 B2 | 2/2013 | Beucher et al. | |
| 8,457,940 B2 | 6/2013 | Xi et al. | |
| 8,625,885 B2 | 1/2014 | Brinson, Jr. et al. | |
| 8,803,878 B2 | 8/2014 | Andersen et al. | |
| 8,843,353 B2 | 9/2014 | Posamentier et al. | |
| 2003/0198400 A1* | 10/2003 | Alderson et al. | 382/274 |
| 2003/0200030 A1 | 10/2003 | Meldahl et al. | |
| 2005/0171700 A1 | 8/2005 | Dean | |
| 2005/0288863 A1 | 12/2005 | Workman | |
| 2006/0116145 A1 | 6/2006 | Hunzinger | |
| 2006/0176488 A1 | 8/2006 | McGraw | |
| 2006/0184488 A1 | 8/2006 | Wentland | |
| 2008/0212841 A1 | 9/2008 | Gauthier et al. | |
| 2009/0122061 A1 | 5/2009 | Hammon, III | |
| 2010/0149917 A1 | 6/2010 | Imhof et al. | |
| 2010/0174489 A1* | 7/2010 | Bryant et al. | 702/6 |
| 2010/0257004 A1 | 10/2010 | Perlmutter et al. | |
| 2011/0046934 A1 | 2/2011 | Hatchell et al. | |
| 2011/0264430 A1 | 10/2011 | Tapscott et al. | |
| 2011/0307178 A1 | 12/2011 | Hoekstra | |
| 2012/0090834 A1 | 4/2012 | Imhof et al. | |
| 2012/0197530 A1 | 8/2012 | Posamentier et al. | |
| 2012/0197531 A1 | 8/2012 | Posamentier et al. | |
| 2012/0197532 A1 | 8/2012 | Posamentier et al. | |
| 2012/0197613 A1 | 8/2012 | Vu et al. | |
| 2012/0322037 A1 | 12/2012 | Raglin | |
| 2013/0006591 A1 | 1/2013 | Pyrcz et al. | |
| 2013/0080066 A1 | 3/2013 | Al-Dossary et al. | |
| 2013/0338927 A1 | 12/2013 | Kumaran | |
| 2014/0052378 A1 | 2/2014 | Muscio et al. | |
| 2014/0081613 A1 | 3/2014 | Dommisse et al. | |
| 2014/0118345 A1 | 5/2014 | Hager et al. | |

FOREIGN PATENT DOCUMENTS

| | | |
|---|---|---|
| WO | WO 99/64896 | 12/1999 |
| WO | WO 01/84462 | 11/2001 |
| WO | WO 2007/005894 | 1/2007 |
| WO | WO 2009/011735 | 1/2009 |
| WO | WO 2009/082545 | 7/2009 |
| WO | WO 2009/137150 | 11/2009 |
| WO | WO 2009/137228 | 11/2009 |
| WO | WO 2009/142872 | 11/2009 |
| WO | WO 2010/053618 | 5/2010 |
| WO | WO 2010/056424 | 5/2010 |
| WO | WO 2012/090001 | 7/2012 |
| WO | WO 2012/146894 | 11/2012 |
| WO | WO 2014/116340 | 7/2014 |
| WO | WO 2015/034759 | 3/2015 |

OTHER PUBLICATIONS

Cabrel, B. et al. (1993), "Imaging Vector Fields Using Line Integral Convolution", *Proceedings of ACM SigGraph* 93, pp. 263-270.

Fomel, S. (2002), "Applications of plane-wave destruction filters", *Geophysics* 67, pp. 1946-1960.

Gesbert, S. et al. (2009), "A New Class of Large-Scale Attributes for Seismic Stratigraphy", 71$^{st}$ EAGE Conf. & Exh., 5 pgs.

Imhof, M. (2005), "Estimating Seismic Heterogeneity with the Structure Tensor", 67$^{th}$ EAGE Conf. & Exh., 4 pgs.

Kyprianidis, J.E. et al. (2008), "Image Abstraction by Structure Adaptive Filtering", *EG UK Theory & Practice of Computer Graphics*, 8 pgs.

Lomask, J. et al. (2006), "Flattening without picking", *Geophysics* 71(4), pp. P13-P20.

Løseth, H. et al. (2009), "Hydrocarbon leakage interpreted on seismic data", *Marine and Petroleum Geology* 26, pp. 1304-1319.

Oppert, S.K. et al. (2006), "Lithofacies Prediction in Clastic Deep Water Reservoirs", 2006 SEG New Orleans Annual Meeting, pp. 1708-1711.

Randen, T. (1998), "New Seismic Attributes for Automated Stratigraphic Facies Boundary Detection", *SEG Expanded Abstracts* 17, 4 pgs.

Randen, T. (2005), "Atlas of 3D Seismic Attributes", Mathematical Methods and Modeling in Hydrocarbon Exploration and Production, Iske and Rand (editors), Springer, pp. 23-46.

Xu, E. et al. (2008), "Seismic Rock-Property Inversion and Lithofacies Prediction at Erha Field, Nigeria", NAPE, 4 pgs.

* cited by examiner

METHOD FOR SEISMIC HYDROCARBON SYSTEM ANALYSIS

CROSS-REFERENCE TO RELATED APPLICATION

This application is the National Stage entry under 35 U.S.C. 371 of PCT/US2011/033519 that published as WO 2011/149609 and was filed on 22 Apr. 2011, which claims the benefit of U.S. Provisional Application No. 61/349,534, filed on 28 May 2010, each of which is incorporated by reference, in its entirety, for all purposes.

FIELD OF THE INVENTION

This invention relates generally to the field of geophysical prospecting, and more particularly to the interpretation of seismic data. Specifically, the disclosure describes a method to detect and rank potential hydrocarbon opportunities using seismic data.

BACKGROUND OF THE INVENTION

An active hydrocarbon system is defined by the presence of a porous reservoir formation that provides storage space for hydrocarbons, a seal that prevents hydrocarbons from escaping the reservoir, a good trapping geometry, and a source formation that contains a high percentage of biogenic material. Under the influence of high temperature and increased pressure, the biogenic material is matured (or cooked) to form hydrocarbons including gas, crude oil, asphalts and tar. Driven by buoyancy and pressure differentials, the hydrocarbons migrate and a fraction of those hydrocarbons accumulates in traps formed by fortuitous geometric arrangements of reservoir formations (i.e., trapping geometries) and seals. Traps have a finite volume, however, and may spill or leak some of the accumulated hydrocarbons, a portion of which may then collect in other traps.

Seismic images of the subsurface allow interpreters to identify some potential traps based on practice and suggestive geometries. At times, the seismic data may provide a direct indication for the presence of hydrocarbons. The standard interpretation practices, however, are labor intensive and often focused on areas where the interpreter gleans some indication of prospectivity. Many opportunities, therefore, remain undetected because the indications are too subtle or hidden, for example by seismic noise. Even if hints of prospectivity are observed, they may not be examined when in the presence of more obvious opportunities or when the interpreter is limited by time constraints. Thus, some hydrocarbon accumulations are discovered late or remain undiscovered.

Published attempts to solve similar problems include the following:

"Method for Seismic Interpretation Using Seismic Texture Attributes" (PCT Patent Application Publication WO 2010/053618) by Imhof discloses a method for the computation of texture attributes that may be used for classification and segmentation of seismic data based on their local appearance. Texture can be used to define seismic facies.

"Windowed Statistical Analysis for Anomaly Detection in Geophysical Datasets" (PCT Patent Application Publication WO 2010/056424) by Kumaran et al. discloses a method to examine seismic data for regions that are statistically anomalous in the context of the data and thus serves to highlight statistically unusual or salient areas.

"Method For Geophysical and Geological Interpretation of Seismic Volumes In Depth, Time, and Age" (U.S. Patent Application Publication No. 2010/0149917) by Imhof et al. discloses a method for the transformation of seismic data from the geophysical domains of depth or two-way travel time to a domain of geological age where all seismic reflections are approximately horizontal and comparable to their state at the geologic time of their formation. Seismic attributes formed from this age domain can improve definition of hydrocarbon system elements.

European Patent EP1110103 B1 ("Method Of Seismic Signal Processing") to Meldahl et al. discloses a method for finding areas in seismic data that are similar to areas specified by the interpreter. Furthermore, it discloses the use of this method for finding seismic indications of percolating hydrocarbons.

U.S. Pat. No. 6,226,596 B1 ("Method for analyzing and classifying three dimensional seismic information") to Gao discloses a method to generate seismic texture attributes that can be used for segmentation, classification, or the definition of seismic facies.

U.S. Pat. No. 6,438,493 B1 ("Method for seismic facies interpretation using textural analysis and neural networks") to West and May discloses a method to generate seismic texture attributes that are used in a supervised classification to assign seismic facies attributes.

U.S. Pat. No. 6,516,274 B2 ("Method for imaging discontinuities in seismic data using dip-steering") to Cheng et al. discloses a method for the detection of edges or discontinuities in seismic data that often indicate faults disrupting and displacing the regular layering in the subsurface.

U.S. Pat. No. 6,725,174 B2 ("Edge-preserving enhancement of seismic images by nonlinear anisotropic diffusion") to Bouts et al. discloses a seismic data processing method that enhances seismic data by removal of incoherent noise while preserving sharp discontinuities corresponding to faults or rapid stratigraphic transitions such as entrenched channels.

U.S. Pat. No. 6,850,845 B2 ("System for multi-dimensional data analysis") to Stark discloses a method of seismic data processing that allows computation of a geologic time attribute used for flattening and associated derivatory attributes.

U.S. Pat. No. 6,850,864 B2 ("Method for analyzing dip in seismic data volumes") to Gillard et al. discloses a seismic data processing method for the estimation of reflection dips that define the local structure.

U.S. Pat. No. 7,203,342 B2 ("Image feature extraction") to Pedersen discloses a seismic data processing method to detect and improve faults or horizons in relatively noisy data.

U.S. Pat. No. 7,424,367 B2 ("Method for predicting lithology and porosity from seismic reflection data") to Saltzer et al. discloses a method for predicting lithology and porosity of subsurface rocks from seismic data and thus allows differentiation between reservoir rocks and sealing formations.

U.S. Pat. No. 7,454,292 B2 ("Inverse-vector method for smoothing dips and azimuths") to Wang et al. discloses a method for the robust computation of horizon dips and orientations that define local structure.

PCT Patent Application Publication WO 2009/011735 ("Geologic Features From Curvelet Based Seismic Attributes") by Neelamani and Converse discloses a method for the computation of hydrocarbon indicators or texture attributes that may be used for the identification of subsurface features.

PCT Patent Application Publication WO 2009/082545 A1 ("Detection Of Features In Seismic Images") by Kumaran and Wang discloses a method for the detection of faults, channels, and similar features in seismic data.

PCT Patent Application Publication WO 2009/137150 A1 ("Method For Geophysical And Stratigraphic Interpretation Using Waveform Anomalies") by Imhof discloses a seismic data processing method to map stratigraphic terminations and pinch outs.

PCT Patent Application Publication WO 2009/137228 A2 ("Transport Property Data Calculated From Derivative Seismic Rock Property Data For Transport Modeling") by Oppert et al. discloses a method to estimate properties such as heat flow or fluid permeability that affect elements of the hydrocarbon system.

PCT Patent Application Publication WO2009/142872 A ("Seismic Horizon Skeletonization") by Imhof et al. discloses an automatic method to extract a large number of horizons from a seismic dataset. Moreover, it discloses a broad pattern recognition workflow that partitions a dataset, analyzes the regions, and ranks them according to their potential of containing hydrocarbons.

"A New Class of Large-scale Attributes for Seismic Stratigraphy", by Gesbert et al., $71^{st}$. EAGE Conference & Exhibition, (2009) discloses a set of stratigraphic attributes computed from two-dimensional seismic data that highlight regional unconformities and regional thinning trends and quantify regional seismic facies trends.

"Applications of plane-wave destruction filters" by Fomel, Geophysics 67, 1946-1960, (2002) discloses a method to estimate seismic horizon dip and orientation which define the local structure.

"Estimating Seismic Heterogeneity with the Structure Tensor" by Imhof, $67^{th}$ EAGE Conference & Exhibition, (2005) discloses a method to estimate seismic horizon dip and orientation that define local structure and seismic texture attributes that characterize local heterogeneity.

"Flattening without picking" by Lomask et al., Geophysics 71, P13-P20 (2006) discloses a method of processing seismic data to approximately flatten the data which allows characterization of some elements of the hydrocarbon system.

"Hydrocarbon leakage interpreted on seismic data" by Løseth et al., Marine and Petroleum Geology 26, 1304-1319, (2009) discloses interpreter-driven methods for detection of hydrocarbons seeping through the subsurface.

"Hydrocarbon Traps, K. T. Biddle and C. C. Wielchowsky, The Petroleum System—From Source to Trap, AAPG Memoir 60, pages 219-235, (1994) presents a collection of hydrocarbon trap types.

"Imaging Vector Fields Using Line Integral Convolution" by Cabral and Leedom, Proceedings of ACM SigGraph 93, 263-270, (1993) discloses a method of visualizing vector fields of flowlines.

"Lithofacies Prediction in Deep Water Water Reservoirs" by Oppert et al., Society of Exploration Geophysicists, Expanded Abstracts, 1708-1711, (2006) discloses a method to estimate the lithology of the subsurface using seismic and wireline data.

"Seismic Rock-Property Inversion and Lithofacies Prediction at Erha Field, Nigeria" by Xu et al., Nigerian Association of Petroleum Explorationists (NAPE) 2008 conference proceedings, discloses a method to estimate the lithology of the subsurface using seismic and wireline data.

Randen and Sonneland ("Atlas of 3D Seismic Attributes", in Mathematical Methods and Modeling in Hydrocarbon Exploration and Production, Iske and Randen (editors), Springer, pages 23-46 (2005)) present an overview of three-dimensional seismic attributes that characterize seismic texture or seismo-stratigraphic features.

What is needed is an automated system that scans an entire dataset for the elements of a hydrocarbon system and outputs a list of prospects for the interpreter to examine. Preferably, this list of potential targets is ranked by expected volume, presence and quality of hydrocarbon system elements, and confidence in their detection and identification. Preferably, the list of prospects is also annotated. The present invention satisfies at least these requirements.

SUMMARY OF THE INVENTION

The invention in one of its aspects is a method that computes multi-scale and typically structure-oriented seismic attributes that relate to the classical elements of a hydrocarbon system, namely reservoir, seal, trap, source, maturation, and migration. The attributes are spatially correlated and compared against a catalogue of hydrocarbon trap configurations to determine the potential presence of hydrocarbon traps and to estimate confidence of their existence.

In one embodiment, the invention is a computer-implemented method for analyzing a volume composed of voxels of seismic data representing a subsurface region for presence of a hydrocarbon system or a particular play, comprising:

partitioning the seismic data volume to form a plurality of segments;

computing a prospectivity score for each voxel, wherein at least two elements are selected, and for each element at least one seismic attribute is selected, and then an element score is calculated for each selected element based on the selected at least one seismic attribute, and the prospectivity score is formed by combining the element scores;

ranking the plurality of segments for presence of a hydrocarbon system or the particular play based at least partly on the prospectivity scores for the voxels of seismic data in each segment; and wherein the elements are selected from a group consisting of reservoir, seal, trap, source, charge, overburden, maturation, migration, accumulation, and timing, or juxtaposition or coexistence of any two or more of them.

In another embodiment, the invention is a method for producing hydrocarbons, comprising:

conducting a seismic survey of a subsurface region;

obtaining a prospectivity analysis of seismic data from the survey, wherein the analysis was conducted by the above method; and drilling a well into the subsurface region based at least in part on the prospectivity analysis, and producing hydrocarbons from the well.

In another embodiment, the invention is a computer program product, comprising a computer usable non-transitory medium having a computer readable program code embedded thereon, said computer readable program code adapted to be executed to implement a method for analyzing seismic data representing a subsurface region for presence of a hydrocarbon system or a particular play, comprising:

partitioning the seismic data volume to form a plurality of segments;

computing a prospectivity score for each voxel, wherein at least two elements are selected, and for each element at least one seismic attribute is selected, and then an element score is calculated for each selected element based on the selected at least one seismic attribute, and the prospectivity score is formed by combining the element scores;

ranking the plurality of segments for presence of a hydrocarbon system or the particular play based at least partly on prospectivity scores for the voxels of seismic data in each segment; and wherein the elements are selected from a group consisting of reservoir, seal, trap, source, charge, overburden, maturation, migration, accumulation, and timing, or juxtaposition or coexistence of any two or more of them.

As with any geophysical data processing method, the invention in practical applications is highly automated, i.e. is performed with the aid of a computer programmed in accordance with the disclosures herein.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The invention in one of its aspects comprises computation of seismic attributes that relate to elements of the hydrocarbon system, analysis of the data for elements of the hydrocarbon system and/or recognition of specific plays or conceptual styles, and ranking and annotating these regions based on size, quality, and confidence in the prospects. Some definitions are given next.

Figure 1:
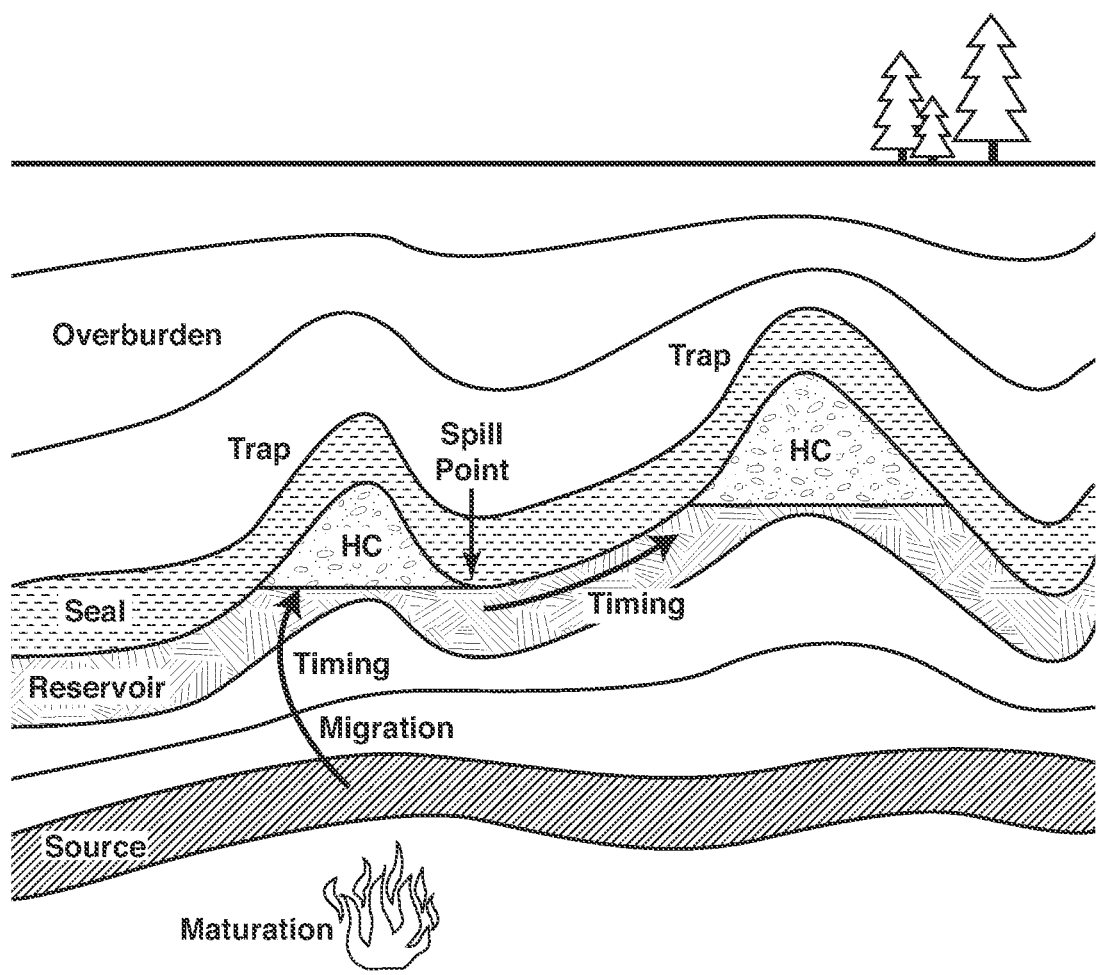
FIG. 1 illustrates elements of the Hydrocarbon System for an anticlinal trap.

Although the term may be used more broadly or narrowly elsewhere, a petroleum or hydrocarbon system is generally used herein to mean a natural system that encompasses a pod of active source rock and all related oil and gas. It includes all the geologic elements and processes that are essential for a hydrocarbon accumulation to exist, as illustrated in FIG. 1. Hydrocarbons found in nature include high concentrations of thermal and/or biogenic gas, found in conventional reservoirs or in gas hydrates, tight reservoirs, fractured shale, or coal; and condensates, crude oils, heavy oils, asphalts and tars. The term "system" describes the interdependent elements and processes that form the functional unit that creates hydrocarbon accumulations. The essential elements include a petroleum source rock (source), reservoir rock (reservoir), seal rock (seal), and overburden rock (overburden). The processes are the formation of the trap and the maturation (generation), migration, and accumulation of hydrocarbons. Implied in these processes is a sequence or timing of events.

An alternate definition of the hydrocarbon system may include only the source rock, the processes of maturation and migration, and their timing; in this case, reservoir, seal, and trap may be defined to form a play. For the purpose of explaining the present inventive method, the term hydrocarbon system is defined to cover source, reservoir, seal, trap, maturation, migration, and timing. Furthermore, the term play is generally used herein to denote a specific combination and arrangement of reservoir, seal, and trapping geometry.

Source rock is a rock rich in organic matter which, if heated sufficiently, will generate oil and/or gas over time. Common source rocks include shales or limestones. Rocks of marine origin tend to be oil-prone, whereas terrestrial source rocks (such as coal) tend to be gas-prone. Preservation of organic matter without degradation is critical to creating a good source rock, and necessary for a complete petroleum system.

Reservoir is a subsurface body of rock having sufficient porosity and permeability to receive, store, and transmit fluids. Sedimentary rocks are the most common reservoir rocks because they have more porosity than most igneous and metamorphic rocks and form under temperature conditions at which hydrocarbons can be preserved. A reservoir is a critical component of a complete petroleum system.

Seal is a relatively impermeable rock, commonly shale, anhydrite, or salt, that forms a barrier or cap above and partially around reservoir rock such that fluids cannot migrate beyond the reservoir. A seal is a critical component of a complete petroleum system.

Overburden is the rock on top of the source and reservoir. In context of the petroleum system, its main function is to form a thick blanket over the source where it increases temperature and pressure to the degree necessary to convert organic matter to hydrocarbons.

Trap is a configuration of rocks suitable for containing hydrocarbons and sealed by a relatively impermeable formation through which hydrocarbons will not migrate. Traps are described as structural traps (in deformed strata such as folds and faults) or stratigraphic traps (in areas where rock types change, such as unconformities, pinch-outs and reefs) or combinations thereof. For structural traps, deformation must occur before hydrocarbon migration, or the hydrocarbons will not accumulate. A trap is an essential component of a petroleum system.

Generation or maturation is the formation of hydrocarbons from a source rock as bitumen forms from kerogen and accumulates as oil or gas. Generation depends on three main factors: the presence of organic matter rich enough to yield hydrocarbons, adequate temperature, and sufficient time to bring the source rock to maturity. Pressure and the presence of bacteria and catalysts also affect generation. Insufficient pressure and temperature, caused for example by a shallow burial with a thin overburden, will render a source immature and generation will be lacking or incomplete. Excessive pressure and temperature, caused for example by deep burial under a thick overburden, will cause degradation of generated oil to gas and subsequently to carbon dioxide and water. Generation is a critical phase in the development of a petroleum system.

Migration is the movement of hydrocarbons from their source into reservoir rocks. The movement of newly generated hydrocarbons out of their source rock is primary migration, also called expulsion. The further movement of the hydrocarbons into reservoir rock in a hydrocarbon trap or other area of accumulation is secondary migration. Migration typically occurs from a structurally low area to a higher area because of the relative buoyancy of hydrocarbons in comparison to the surrounding rock. Migration can be local or can occur along distances of hundreds of kilometers in large sedimentary basins and is critical to the formation of a viable petroleum system.

Accumulation refers both to an occurrence of trapped hydrocarbons, i.e., a play or an oil or gas field, and to the phase in the development of a petroleum system during which hydrocarbons migrate into and remain trapped in reservoir rocks.

Timing refers to the relative order in which elements are formed or modified, or the order in which processes occur. A trap can accumulate migrating hydrocarbons only if it is formed before migration. A trap may be unfilled if migration has not yet reached its location. A trap may lose its charge, at least partially, if the seal is breached after accumulation.

A play is a conceptual model for a style of hydrocarbon accumulation often used to develop prospects in a basin, region or trend or used to continue exploiting an identified trend. A play (or a group of interrelated plays) generally occurs in a single hydrocarbon system and may be comprised of a group of similar prospects.

A prospect is an area in which hydrocarbons have been predicted to exist in economic quantity. A prospect is often an anomaly, such as a geologic structure or a seismic amplitude anomaly, which is recommended as a location for drilling a well to ascertain economic quantities of hydrocarbons. Justification for drilling a prospect is made by assembling evidence for an active hydrocarbon system, or demonstrating reasonable probabilities of encountering good quality reservoir rock, a trap of sufficient size, adequate sealing rock, and appropriate conditions for generation and migration of hydrocarbons to fill the reservoir. For the purpose of the inventive method, prospect is used broadly to denote an area that is recommended for further, detailed analysis.

As stated above, what is needed is a method that automatically analyzes seismic data for the presence of elements of the hydrocarbon system, flags regions where play elements are juxtaposed in favorable configurations or consistent with a known or specified play, and ranks these prospects with regard to their hydrocarbon accumulation potential. Such a system focuses analysis and interpretation onto more prospective areas. Moreover, the system may recognize play type and provide a confidence score for individual elements. For each prospect, unidentified elements or elements with low confidence are vital and demand special attention during subsequent analyses to derisk the prospect. The system may be employed various times during the lifecycle of a region or asset. First, the system may be used on regional, typically two-dimensional data to identify prospective areas; for example, to prepare a bid on a block or to site a three-dimensional exploration survey. In the exploration phase, the system may be used for scoping to focus and guide the interpreter toward smaller, more manageable subsets of the seismic data volume. At the production stage, the system may be used to locate smaller prospects within reach of already sited infrastructure. Finally, the system may be used to ensure that no prospects were overlooked before relinquishing or selling the asset.

Figure 2:
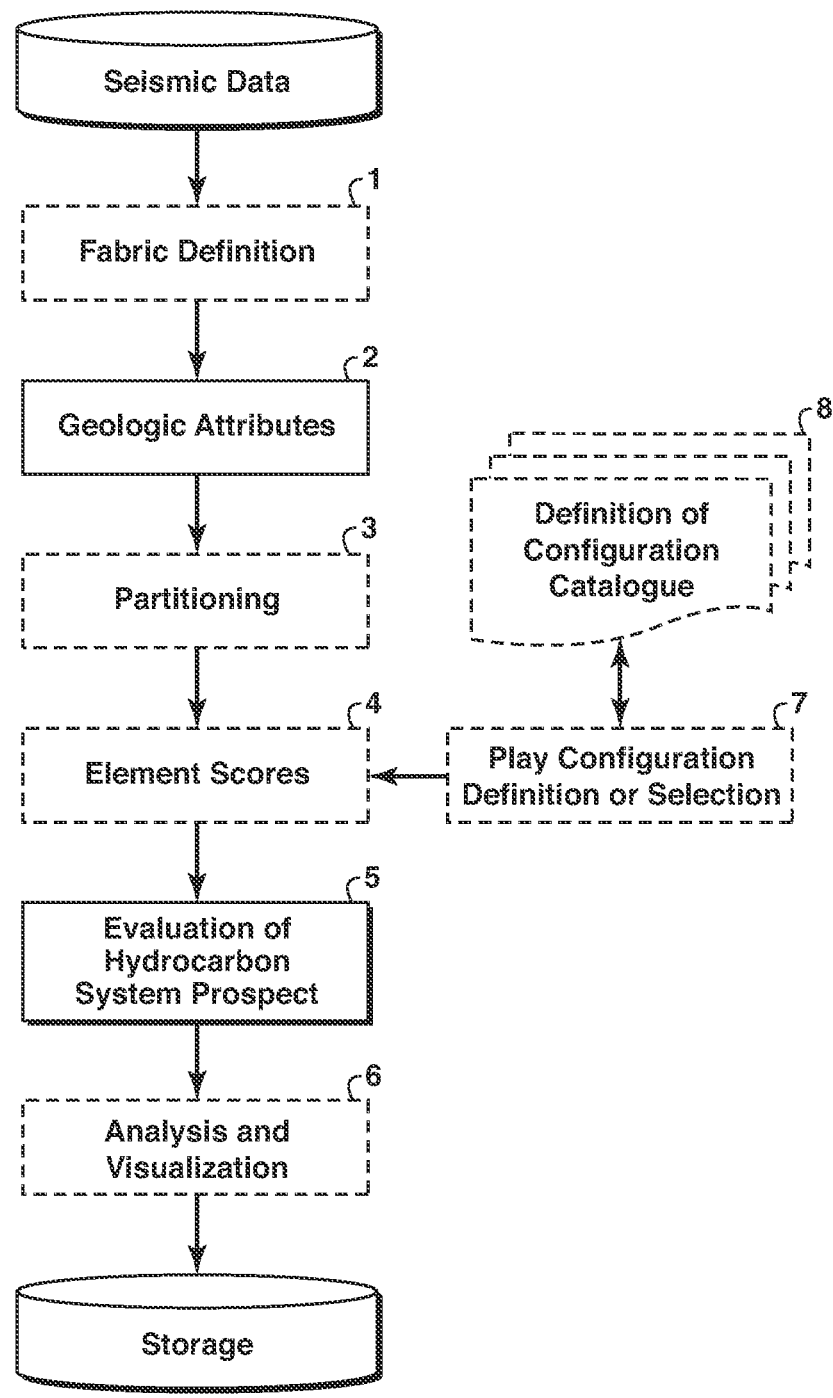
FIG. 2 is a flow chart showing basic steps in one embodiment of the invention.

FIG. 2 is a flowchart showing basic steps in one embodiment of the inventive method that includes two set steps (boxes have solid lines) and six optional ones (boxes of dashed lines) that depend on inputs, assumptions made, and the mode in which the system is used. In step 2, attributes are generated that relate to elements of the hydrocarbon system or specific play elements. In step 5, the data are analyzed and locations are ranked with regard to the attributes, thus identifying potential prospects that are then stored for further analysis or visualization.

Optional step 1 defines the fabric of the subsurface, i.e., the geometries of the subsurface strata and their deformation by faults and folds that form the basis for the computation of some attributes or may be needed by other computations to aggregate information from similar strata. Many attributes that are useful for the inventive system are formed by integrating or averaging more traditional attributes along the fabric. In the optional step 3, the data are separated into at least two segments or partitions for analysis and prospect definition. Optional step 4 is the formation of normalized scores for elements of the hydrocarbon system using one or more of the attributes. Optional step 6 is the analysis of the formed and ranked prospects; for example, identification of the least expressed element(s) that should be examined further. Optional step 7 is the definition or selection of at least one specific concept or play type that is to be searched instead of a generic search for neighboring elements of the hydrocarbon system. Finally, optional step 8 is the definition, creation, and management of a catalogue of play types and the configuration of their elements.

Figure 3:
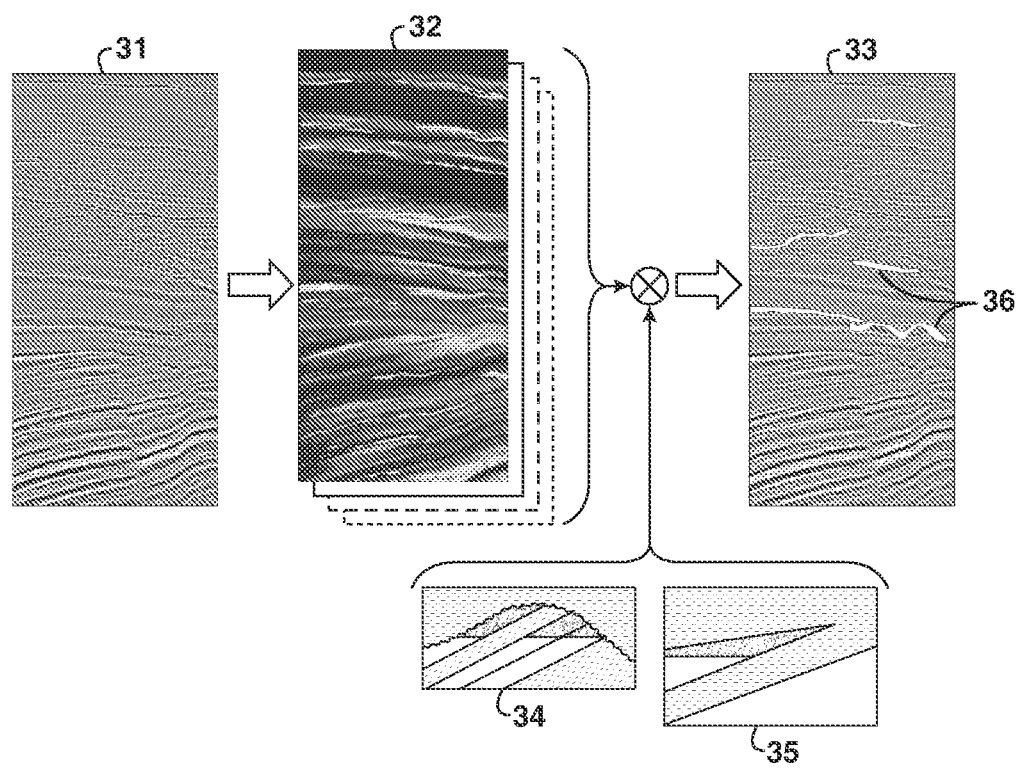
FIG. 3 is a schematic diagram illustrating one embodiment of the present inventive method.

A schematic application of the inventive method is presented in FIG. 3 where seismic attributes 32 are computed from seismic data 31. The attributes are then combined 33 to highlight regions (e.g. 36) that may constitute stratigraphic plays, in this case the buried-hill play 34 and the stratigraphic pinchout play 35.

Fabric Definition

An attribute is a measurable property of seismic data, such as amplitude, dip, frequency, phase and polarity. Attributes can be measured at one instant in time or over a time window and may be measured on a single trace or set of traces or on a surface interpreted from seismic data, a window of data, or even on multiple seismic volumes simultaneously. The present inventive method uses many of the classical attributes that are well-known to those experienced in the art of attribute analyses or seismic interpretation. For the inventive method, however, some of these attributes are modified, for example by integration along strata or structure, to emphasize regional variations over local ones. Moreover, novel geologic attributes (2) are disclosed that directly relate to hydrocarbon system elements or play elements, and the particular configurations of these elements. Since geologic attributes may be embodied in alternate ways and different geologic attributes may relate to the same element or configuration of elements, scores (4) may be computed that synthesize the different embodiments and attributes together to one measure that estimate the chance of encountering a particular play or hydrocarbon-system element or a particular geometric arrangement of such elements. The scores are then combined (6) into likelihoods for the configurations that may be used for visualization, analysis, or rating and ranking.

With regard to FIG. 2, less than all the illustrated steps may be required to implement a particular embodiment of the invention. Individual steps may be combined or separated into multiple components. Furthermore, additional and/or alternative methodologies may employ additional steps not shown herein. While the flow chart illustrates various actions occurring serially, it should also be appreciated that some actions could occur in series, substantially in parallel, and/or at considerably different points in time. Steps may also be repeated. One example of these variations is step 1, the definition of the fabric, structure or layering structure.

The fabric may not be needed for some attributes used in the invention and thus, when using only such attributes, the fabric definition may be ignored. Most attributes used for the inventive method, however, will require a fabric for their formation. The fabric could be computed on the fly for every attribute as needed. Preferably, however, the fabric is generated only once, then stored and used repeatedly to generate, modify, or integrate attributes. Step 1, the formation of the fabric, is shown as an optional step, because depending on the attributes used in different embodiments of the inventive method, the fabric could be computed once, repeatedly, or not at all.

An advantage of generating the fabric once is consistency between different attributes, because all are based on the same fabric. A disadvantage of generating it only once is that the resulting fabric needs to be represented and stored in some manner that may be inefficient or even unsuitable for some applications of attribute generation, modification, or integration. Alternatively, each application may generate its own fabric in a suitable and efficient representation that may cause inefficiencies for the overall system because the same fabrics with the same representations may be computed multiple times. Yet another option is to compute the fabric with a few select methods and representations that are stored and thus reusable. With this alternative method, the disadvantages are increased storage requirements and repeated access to the storage media. In practice, the preferred method may be to compute and store the fabric, or components thereof, for some of the more common methods and representations, and compute less common ones when needed.

Methods for computing the fabric may be based on dip, orientation or strike estimates; structure tensors, waveform correlations, or skeletonizations. One particular way of estimating dip and dip orientation is by use of gradients on seismic data in the two horizontal directions and the vertical direction (e.g., U.S. Pat. No. 6,850,864 B2, "Method for analyzing dip in seismic data volumes" to Gillard et al.). Another dip estimator is based on plane-wave deconstruction filters (e.g., "Applications of plane-wave destruction filters" by Fomel, *Geophysics* 67(6), 1946-1960, (2002)). Methods based on the structure tensor allow computation of vectors normal and tangent to seismic reflections (e.g., "Estimating Seismic Heterogeneity with the Structure Tensor" by Imhof, 67$^{th}$ EAGE Conference & Exhibition, (2005); or U.S. Pat. No. 7,454,292 B2, "Inverse-vector method for smoothing dips and azimuths" to Wang et al.). Dips may be resolved into time shifts for the automatic picking of surfaces (e.g., "Flattening without picking" by Lomask et al., *Geophysics* 71(4), P13-P20 (2006)).

An alternative method of computing reflection dip and azimuth is based on the gradient of isocontours. Gradient is a local vector that characterizes the steepest increment direction of a function. Treating seismic data, amplitude for example, as a function $f$ in three dimensional space (x,y,t), the gradient is defined as $\nabla f$. Since there are three components in the resulting gradient vector $\nabla f$, only three neighboring samples are needed to estimate $\nabla f$ to first order. Using more surrounding samples, however, allows estimation of the gradient from an over-determined system, for example in the least-squares sense, or employing a higher-order approximation to the finite-difference approximation. In either case, the resulting gradient will be smoother. The selection of neighbor points is not limited to any particular sequence or pattern. Rather, the neighborhood can be defined as points or voxels arranged in a sphere, a cylinder, a box, or any other type of shape surrounding the point of interest. Moreover, this shape may be aligned to the fabric or an estimate thereof at every point. Derivative attributes can then be derived from this gradient, including magnitude and direction, i.e., dip and azimuth in 3D. Gradient, as ordinarily defined, always points in the direction of increasing amplitude. In seismic data with amplitudes cycling from negative troughs to positive peaks and back, the result would be that parallel layers exhibit opposing dip values. One solution is to normalize the gradient with regard to one half-space by flipping its direction, for example to invert the sign of the gradient such that all gradient points are oriented in the positive y direction:

$$\theta = \text{sgn}(f_y) \cdot \arctan \frac{f_t}{\sqrt{f_x^2 + f_y^2}} \text{ and } \omega = \arctan \frac{\text{sgn}(f_y) f_x}{\sqrt{f_t^2 + f_y^2}} \text{ or}$$

$$\omega = \arctan \frac{f_x}{f_y}.$$

This gradient calculation is a more robust formulation than existing gradient calculation methods. It also has multi-scale capability, since the window size (number of neighbor points) within which the gradient is computed can be varied.

Lateral correlation of waveforms is another method of generating a fabric. In a first step, events such as peaks, troughs, and/or zero crossings are determined. In a second step, waveforms around these events are compared with the events of neighboring traces to find and connect the most similar ones. Note the asymmetry that occurs in that each event connects to only one other event, namely, the most similar one. Multiple events, however, may connect to one and the same event. The result is a directed graph structure where the vertices correspond to events such as peaks, troughs, and/or zero crossings; and edges connect individual events to the most similar ones in the neighboring traces. Starting at one event in a particular trace, it is often possible to follow directed edges between events and traces and later return to a different event in the original trace, which indicates stratigraphic (or topologic) inconsistencies. To distinguish this method from others, the terms raw skeleton or raw skeletonization will be used, if necessary.

A preferred method for computing a fabric is by topological skeletonization, which automatically creates reflection-based surfaces in a topologically consistent manner where individual surfaces do not overlap themselves and sets of multiple surfaces are consistent with stratigraphic superposition principles (PCT Patent Application Publication WO 2009/142872 A1, "Seismic Horizon Skeletonization" by Imhof et al.). To distinguish this method from others, the terms topologic skeleton or topologic skeletonization is used, if necessary. In this method, the topologically consistent surfaces are labeled monotonically in a top-down fashion, which allows assignment of a pseudo age to every sample of the seismic data and conversion of seismic data from the traditional geophysical depth or two-way-time domain to a geologic age domain (e.g., U.S. Pat. No. 6,850,845 B2, "System for multi-dimensional data analysis" to Stark; PCT Patent Application Publication WO 2009/142872 A1, "Seismic Horizon Skeletonization" by Imhof et al.; and continued in U.S. Patent Application Publication No. 2010/0149917 "Method for Geophysical and Geological Interpretation of Seismic Volumes in Depth, Time, and Age" by Imhof et al.). A resultant age mapping volume and/or depth mapping volume allow transfer of data between the geophysical depth (or two-way-time) domain and the constructed geologic age domain and vice versa. Each horizontal slice through a depth mapping volume corresponds to a depth (or time) structure map for a particular horizon.

Yet another skeletonization method is based on morphological thinning; the result will be termed morphological skeleton. Seismic data are blocked to binary images, for example by reducing the data to just their polarities, e.g., ±1. Bands of value +1 are reduced to lines with a value of +1 with equal connectivity, for example by application of morphological thinning. Bands of value −1 are reduced to lines with a value of −1. All other samples are set to zero. A similar result is obtained from the apparent polarity attribute that is formed by the polarity of instantaneous phase computed at the local amplitude extrema.

Another aspect of computing the fabric relates to faults that may be detected as discontinuities on seismic data (e.g., U.S. Pat. No. 6,516,274 B2, "Method for imaging discontinuities in seismic data using dip-steering" to Cheng et al.; or PCT Patent Application Publication WO 2009/082545 A1 ("Detection Of Features In Seismic Images" by Kumaran and Wang). Detected fault segments may be further cleaned up or refined (e.g., U.S. Pat. No. 7,203,342 B2, "Image feature extraction" to Pedersen).

Geologic Attributes 1.a Generation of Regional Attributes by Long Distance Structure Oriented Smoothing A geologic attribute is a seismic attribute that highlights or quantifies some aspect of the hydrocarbon system or a play. Geologic attributes are often regional in nature. They may, for example, estimate a seismic data property over tens or hundreds of voxels. Over such distances, attributes are preferably computed along the fabric in a structure-oriented manner to prevent mixing and thus contamination from other strata cutting through the analysis window.

Given the fabric as defined by the original seismic data volume, any attribute may be converted to a regional attribute by integrating or averaging it along the fabric. One such method is based on nonlinear, anisotropic diffusion filtering (e.g., U.S. Pat. No. 6,725,174 B2, "Edge-preserving enhancement of seismic images by nonlinear anisotropic diffusion" to Bouts et al.), which smoothes seismic data predominantly along the direction of the reflections. Traditionally, the fabric or the directions of the reflections are computed using the seismic structure tensors for the given seismic dataset that is to be smoothed, but the fabric can be defined with any method. Some are disclosed herein.

In the present invention, nonlinear anisotropic diffusion may be used to compute the fabric for the primary seismic amplitude volume, but then that fabric is used to smooth a secondary dataset along the direction of the reflections in the primary seismic amplitude volume. In some cases, this secondary dataset may not even be layered or banded, which prevents computation of its own proper structure tensor. In cases where the secondary dataset is banded, it may nevertheless be advantageous to smooth it along the fabric of a reference seismic volume, for example to enhance consistency between different datasets after structure-oriented smoothing.

An alternative method of structure oriented smoothing over long distances in the present invention is based on line integral convolution (LIC). Line integral convolution is a well-known texture synthesis algorithm used in image processing or data visualization ("Imaging Vector Fields Using Line Integral Convolution" by Cabral and Leedom, *Proceedings of ACM SigGraph* 93, 263-270, (1993)). A low-pass filter is used to convolve an input noise texture, for example a random noise image, along pixel-centered symmetrically bi-directional streamlines to exploit spatial correlation in the flow direction. Often, the streamlines are not represented by curves but by a vector field whose vectors are tangent to the streamlines, and the streamlines are computed by integration.

Figure 4:
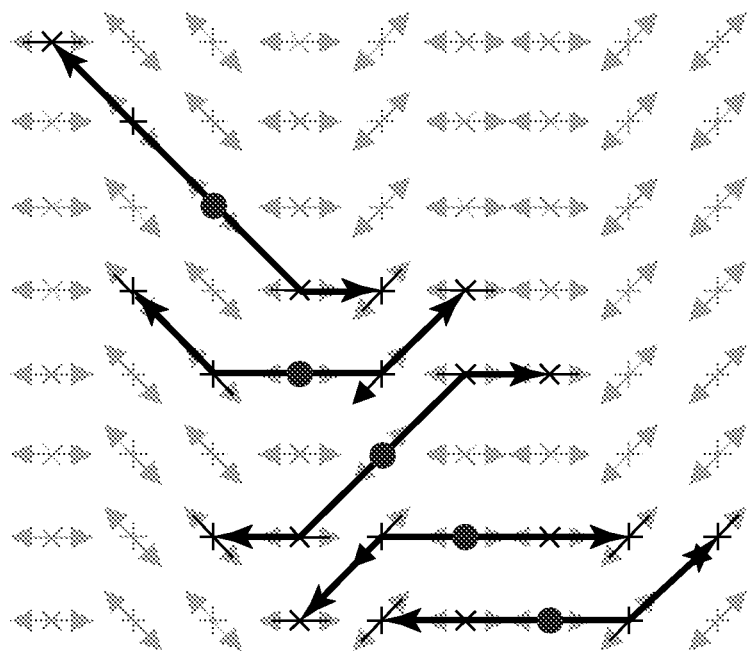
FIG. 4 illustrates how the filter stencil of a line integral convolution filter follows the tangent directions.

Substituting some seismic attribute data for the noise texture and using the fabric to define the streamlines allows using line integral convolution to filter the given attribute along the fabric, which is a new approach to structure-oriented filtering. Preferred fabric definitions are based on dip, for example as computed from structure tensors. Further efficiency is gained by discretizing the fabric, or more specifically the dips or reflection tangents, to 0, 45, 90, 135, 180, 225, 270, or 315°; i.e., purely lateral, purely vertical, or purely diagonal, which replaces the numerical integration and associated interpolation with movement along a linked list. Since seismic data are typically more or less horizontally banded, further efficiency is gained by forcing all tangents to go from left to right which reduces the dips to 0, +45, and −45°. FIG. 4 illustrates the application of a line convolution filter where the gray crosses indicate the location of the samples and the arrows indicate the discretized dip directions. The filters are applied at the locations indicated by the heavy black dots. The drawing shows how the filter stencils centered at the dots follow the vectors and thus illustrate the fabric gathering the sample values, marked with black crosses, along these paths.

Figure 5:
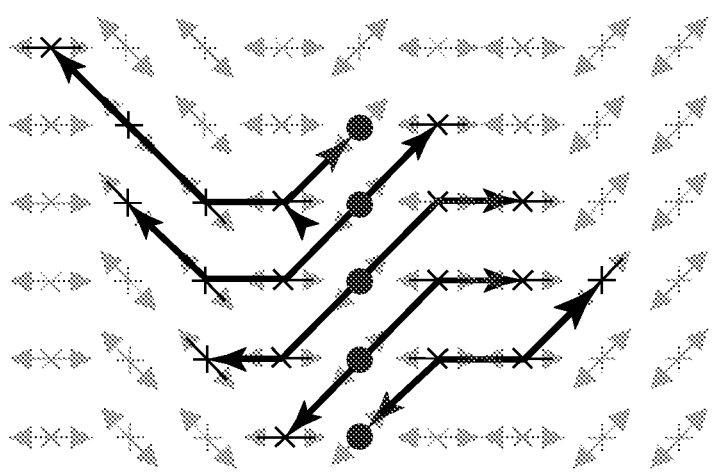
FIG. 5 illustrates how the line integral convolution filter can be made more robust.

To render the line integral convolution filter more robust in the presence of faults and other complexities, it can be made edge preserving by applying the filter in multiple stencil configurations that are not necessarily centered at the current sample location (illustrated in FIG. 5). Out of all tested stencil configurations, the one that exhibits the least variance among its samples is preferably ultimately applied at a particular location. Depending on the filter coefficients and the nature of the attribute that is being treated with such an edge-preserving line convolution integral filter, criteria other than minimal variance may be appropriate. Other possible criteria include maximal variance, minimal or maximal output, and/or avoidance of especially flagged sample locations.

Figure 6:
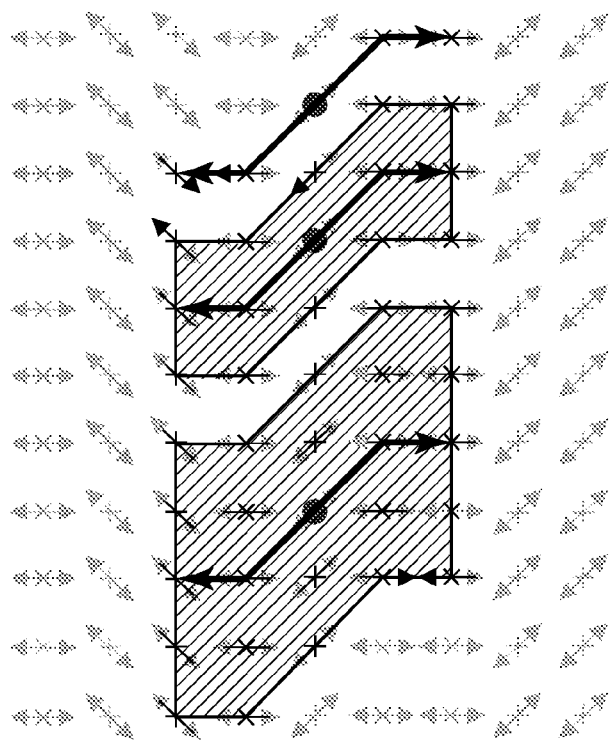
FIG. 6 illustrates that the line integral convolution filter stencil can have an extended thickness.
Figure 7:
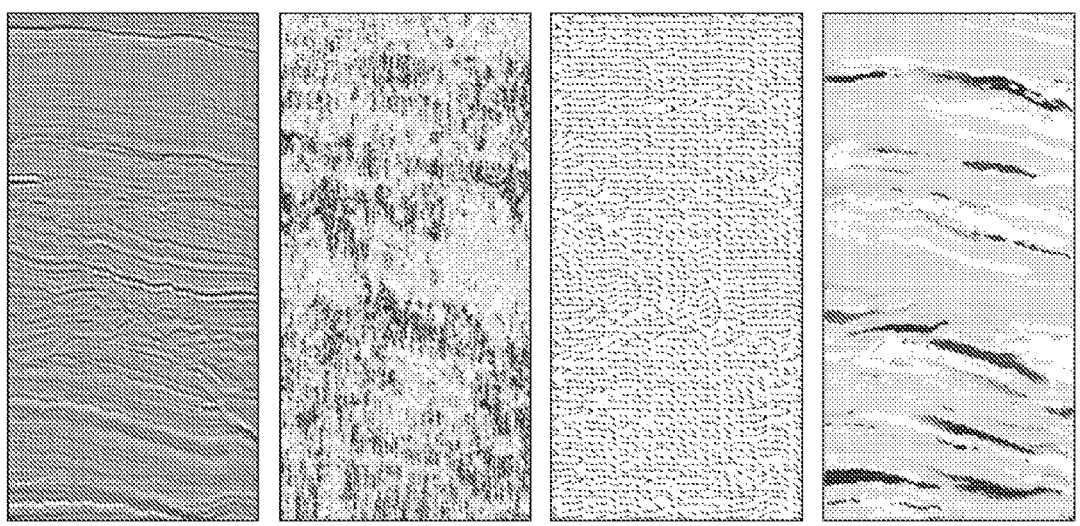
FIG. 7 shows an example of converting a local attribute to a regional one (left: seismic data, left-middle: local convergence attribute, right-middle: tangent vector field, and right: regional convergence)

The filter coefficients do not need to be uniform, which allows for application of differentiators (high-pass filter), integrators (low-pass filters), or combinations thereof. The filters may be linear or nonlinear, for example median filters or mode filters. FIG. 6 illustrates that the filter stencil can have an arbitrary shape that is deformed to conform to the vector path through the current sample location. FIG. 7 shows an example application of such filtering tools, converting a local attribute to a regional one.

Yet another method used to perform structure oriented filtering over long distances involves the exploitation of surfaces obtained by seismic skeletonization (PCT Patent Publication No. WO 2009/142872 A1, "Seismic Horizon Skeletonization" by Imhof et al.), where the skeleton surfaces provide the fabric along which the attributes are filtered. Instead of smoothing along discrete surfaces, which may require interpolation, smoothing can be performed along isosurfaces of the age mapping volume constructed from the skeleton surfaces. Alternatively, the attribute can be transformed from the traditional domain of depth or geophysical two-way traveltime to the domain of geologic age. In the geologic age domain, a horizontal slice corresponds to one horizon, and thus, smoothing or filtering of horizontal slices is by definition structure oriented (U.S. patent application Ser. No. 12/623,034 "Method For Geophysical and Geological Interpretation of Seismic Volumes In Depth, Time, and Age" by Imhof et al.). After filtering in the age domain, the results can be transformed back to the domain of depth or two-way traveltime.

Independent of the method used for structure-oriented filtering, geologic attributes can be computed as multi-scale attributes because the filter size is specified by either the interpreter or the system. Instead of computing a geologic attribute at only one scale, an interpreter or system may choose multiple filter sizes, allowing computation of the same geologic attribute at different scales.

1.b Hessian Attributes

A new seismic attribute of the present invention is the Hessian or second-order spatial derivative (dyadic) tensor $H=\nabla\nabla f$, which is computed in a similar fashion as the modified gradient. At every location of interest, the Hessian in three dimensions can be represented by a symmetric 3×3 matrix, i.e., by six independent components. To compute the Hessian at any voxel location, at least six neighboring voxels are needed, since it has six independent components. The calculation, however, can involve more voxels to obtain smoother and more stable estimates for the Hessian: by calculating its components from an over-determined system, for example in the least-squares sense, or employing a higher-order approximation to the finite-difference approximation of the spatial derivatives. The selection of neighbor points is not limited to any particular sequence or pattern. Rather, the neighborhood can be defined as points or voxels arranged in a sphere, a cylinder, a box, or any other type of shape surrounding the point of interest. Moreover, this shape may be aligned to the fabric or an estimate thereof at every point.

From a geometrical point of view, the seismic data volume consists of point features (e.g., noise), curvilinear features (e.g., terminations or channels), surface features (e.g., faults), or volume features (e.g., channel belts or salt bodies) embedded in layered background structure. In current practices, directional second-order derivatives of amplitude or trace correlation signals are usually calculated to detect heterogeneities that typically occur at geological features such as faults, erosion boundaries, and pinch-outs. Lacking cross derivatives, attributes based on traditional second-order derivatives represent local variations in the data incompletely. With its six components, the Hessian characterizes the local convexity or concavity of the seismic data. The traditional second-order derivatives are found on the diagonal of the Hessian, while the cross-derivatives are found off-diagonal. Attributes can thus be formed from these six components and combinations thereof. The components, and therefore the attributes, are formed from second-order derivatives of a seismic volume and show spatial change in gradient. They reflect spatial changes in dip and azimuth angles in the seismic volume, which allows highlighting anomalous regions and groups of interrelated features. By highlighting different types of "discontinuities" and their spatial interrelationships, seismic volumes can be characterized and visualized better.

Another use of the Hessian is to serve as an intermediate step for calculating spatial curvatures, as illustrated in the next section. In addition, eigenvalues of the Hessian matrix and projections of the Hessian onto certain surfaces also form measures of how curved the isocontours are.

Curvature measures the degree to which an object, a surface for example, deviates from being flat. However, specific definitions depend on context. For example, curvature can be defined for a plane or a space curve, in which case it is a scalar. It can also be defined for a parameterized surface embedded in three-dimensional space, in which case it is a tensor. With the objective of discovering attributes related to stratigraphy, two new types of curvature are defined here. The first is isocontour curvature in a two-dimensional seismic image. An arbitrary two-dimensional cross-section through a seismic volume is treated as a map of a function $f(x,y)$. An isocontour is the curve in this cross section whose coordinates satisfy $f(x,y)=$constant. Its curvature is defined as $$\kappa = \left| \frac{f_{xx}f_y^2 + f_{yy}f_x^2 - 2f_{xy}f_x f_y}{(f_x^2 + f_y^2)^{3/2}} \right|$$

where all quantities are defined by components of the isocontour gradient vector or Hessian tensor. This curvature attribute can be particularly useful in highlighting geometric features of high curvature, such as terminations, corners, and junctions.

Another definition of isocontour curvature is based on a generalization to three dimensions. The seismic data are treated as a function of three independent variables $f(x,y,t)$. All voxels that satisfy $f(x,y,t)=$constant constitute an isosurface, i.e., a curved surface embedded in three-dimensional space. For a curved space, curvature is a tensor quantity that allows extraction of multiple scalar quantities related to curvature such as the principal curvature, mean curvature, and Gaussian curvature. For such a curved surface, one may define a surface normal by normalization of the isocontour gradient $n=\nabla f/|\nabla f|$. Surface tangents may be defined using the condition $t \cdot n=0$. Note that there is an infinite number of tangents that satisfy this condition at any given point on the surface. And there are just as many orthogonal planes to the surface defined by a tangent t and the normal n. The intersection of such a plane with the surface is a curve whose curvature is called the normal curvature. The maximum and minimum of all normal curvatures are termed the principal curvatures $K_1$ and $K_2$, from which the Gaussian curvature is computed as the product $K=K_1*K_2$, while their algebraic average obtains the mean curvature $M=(K_1+K_2)/2$.

All of these quantities are defined for each point in space, and they can be expressed compactly as a matrix S known as the Shape operator. To build one convenient embodiment of S, note that the space of all tangents at the given point can be expressed as the eigenvectors of a matrix T obtained by subtracting the outer product of the normal with itself from the identity matrix, T=(I−nn). T effectively projects any three-dimensional vector onto the tangent plane. Thus, one can measure the change of the gradient restricted to that plane by multiplying the Hessian matrix by T, or symbolically H'=H·T, where · denotes the inner, or matrix, product. Finally, S is obtained by normalizing the Hessian: $S=H'/|\nabla f|^2$. The principal curvatures are the eigenvalues of S, dividing the trace of S by two yields the mean curvature, M=trace(S)/2, and the determinant det(S)=K defines the Gaussian curvature.

All of these curvature measures can be treated as seismic attributes and can be used to detect horizon terminations and junctions that define features of geologic importance, such as faults, erosional truncations, pinchouts, and other geometric relations.

The isocontour attributes are in the form of vectors and second-order tensors. Projections of these attributes onto particular directions and surfaces may characterize the seismic volume better than any individual component thereof. Projection of the gradient onto any direction is simply the dot-product between the gradient vector and a unit directional vector. Such a projection defines the directional derivative of an isocontour function along a particular direction. The larger this projection (or directional derivative) is, the steeper the change in amplitude along that direction. Similarly, the projection of the Hessian onto a unit directional vector d is the second-order derivative of an isocontour function along that direction and can be computed as $f_{dd}$=d·H·d, where · denotes the inner, or dot, product. For the Hessian, projections of particular interest are along the gradient direction, the dip direction, or the direction orthogonal to the plane spanned by both gradient and dip.

Gradient of the isocontour dip volume and its projections also contain useful information of the subsurface structure. Dip gradient quantifies variations of dipping direction in the original volume. The projection of dip gradient along dip direction is a measure of the rate of change of dip. This helps to detect curved features on the reflectors, such as ridges, mounds, holes, and valleys. The projection of dip gradient onto a vector that is normal to the dip direction defines a measure of the rate of reflector convergence or divergence.

While these isocontour attributes (gradient, dip, orientation, Hessian, curvature, and projections) can be used as local attributes, the results can be affected by artifacts in areas contaminated with noise or areas with high complexity. Smoothing reduces such artifacts and can be performed, for example, by convolution with a broad lowpass filter or application of a large-windowed median filter. Preferably however, smoothing is performed in a structure-oriented manner over longer distances along the fabric to prevent mixing across strata. By application of a long-distance, structure oriented filter, local isocontour attributes can be converted to geologic attributes.

1.c Convergence

Another new geologic attribute of the present invention is convergence, which detects where seismic reflections converge to form a trend of regional thinning of reflection packages, highlighting pinchouts, wedges, or stratigraphic onlaps and downlaps. The convergence attribute can be used to emphasize stratigraphic features to an interpreter or as input to an assisted or automated pattern recognition system, such as the seismic hydrocarbon system analysis system of the present invention. Two methods of computing convergence are: by use of the Hessian or by use of the gradient of dip in directions normal to the fabric or dip. Depending on the neighborhood used to compute the Hessian or gradient, structure-oriented long-distance smoothing along the fabric may be employed using line integral convolution, a diffusion filter, a skeleton-guided filter, or filtering in the age domain. Each of these uses the original seismic data to guide the filter along the reflectors.

Another method to compute the convergence attribute is to first measure local reflector thickness, then estimate a local lateral thickness derivative, and finally, perform a lateral smoothing operation along the reflections to obtain regional convergence trends. If the trends are estimated on single, two-dimensional cross sections, then convergence can occur to the left or right, or alternatively be called convergence and divergence along one reference direction, for example left to right. If the trends are estimated from orthogonal slices extracted from a 3-D dataset, then convergence can be associated with an orientation and magnitude. Moreover, the trends can also be estimated in a volumetric sense using three-dimensional analysis windows instead of multiple orthogonal two-dimensional ones.

Methods to estimate local reflector thickness include: loop duration, the distance between juxtaposed extrema or zero crossings; instantaneous frequency, or the time-difference between two juxtaposed surfaces of the seismic skeleton. A continuous attribute such as instantaneous frequency may need to be blocked. Any such thickness attribute can be differenced laterally to estimate the rate of local thickness changes. The rate of local thickness changes may also be estimated from the divergence of a vector field, for example reflection normals, or from the divergence of a tensor field, for example reflection tangents.

To obtain regional convergence trends, local thickness derivatives are smoothed with a structure-oriented long-scale filter operator along the fabric using line integral convolution, a diffusion filter, a skeleton-guided filter, filtering in the age domain, or any other method that uses the original seismic data to guide the filter along the reflectors. For computational efficiency, the labels or horizon indicators may be encoded with the derivatives.

Figure 8:
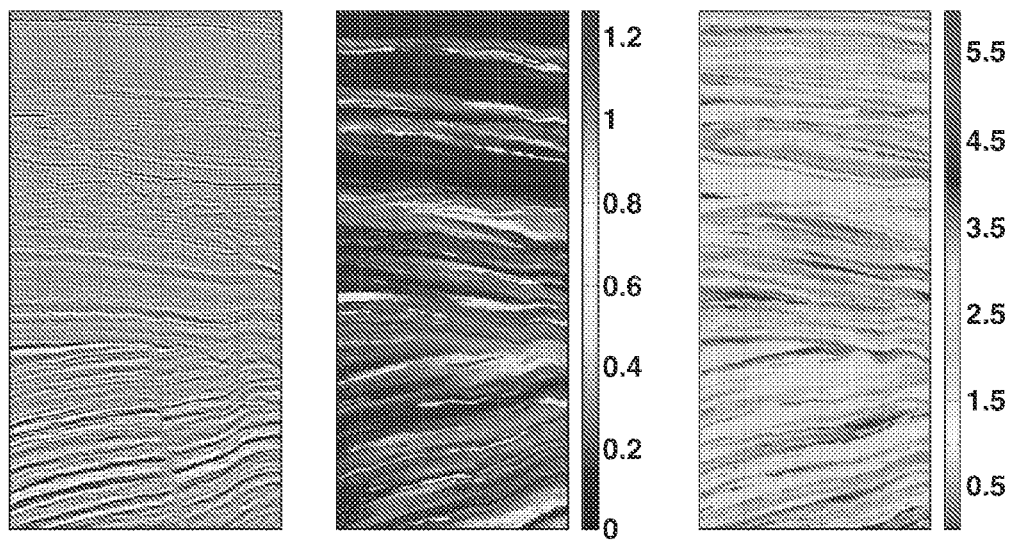
FIG. 8 shows an example of the three-dimensional convergence attribute with a convergence magnitude component (light: strong convergence, dark: no convergence) and a convergence orientation component.

FIG. 7 shows the convergence attribute based on loop duration, lateral derivative, and using the line integral convolution to enhance the long-distance convergence trends. By performing this procedure over both inlines and crosslines, a three-dimensional convergence attribute with magnitude and orientation can be constructed (FIG. 8).

1.d Confluence

Figure 9:
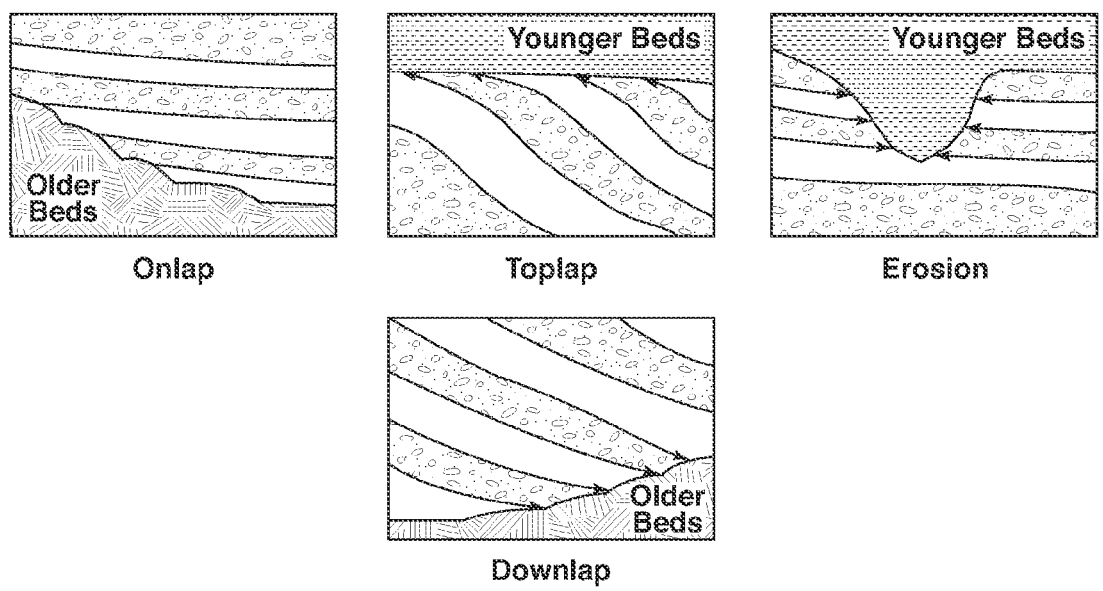
FIG. 9 defines stratigraphic termination relations.

Yet another new geologic attribute of the present invention is called confluence. Seismic reflections are treated as a network of roads carrying traffic, and some of these roads are congested because they are joined by many others. Confluence measures this congestion by estimating how many paths pass through any given voxel. In terms of seismic stratigraphy, branching and merging reflections produce terminations in the forms of downlaps, onlaps, toplaps, and truncations, as depicted in FIG. 9. All of these terminations are potentially associated with unconformities; downlaps may also be associated with downlaps surfaces, i.e., flooding or transgressive surfaces.

One family of methods used to compute confluence is based on the density of flow lines specified by the reflection tangents. Flow lines are either computed by integration of the tangent field or simply by following a chain of discretized tangent directions. Starting, for example, with the leftmost trace, a new flow line can be initiated and propagated toward the right. New flow lines are initiated either at regularly spaced increments of depth or two-way traveltime, or at specific events such as peaks (maxima), troughs (minima), and/or zero crossings. Samples on a flow line, and preferably in a small zone around the flow line, are marked to belong to that particular flow line. Once all flow lines in the first trace are initiated and marked, the algorithm proceeds to the neighboring trace on the right and begins to initiate and mark additional flow lines, either at regular increments in as-of-yet unmarked areas or at as-of-yet unmarked events. Flow lines may be traced and marked either to the left or to the right; preferably, the flow lines are computed and marked both to the left and the right of the current trace. Once all unmarked areas or events have been used to initiate a flow line, and thus are marked, the process repeats with the next trace.

When every sample or event has been marked at least once, confluence is determined by computing how many times each sample has been marked. Preferably, this calculation is preformed simultaneously with the sample/event marking by simply incrementing counters associated with the sample locations. While these steps can be performed from left to right, preferably they are repeated from right to left as well and then added to the previous result, ensuring symmetry. Marking of the samples in a region around a flow line may be performed with a constant indicator or with values that vary depending on their distance from the flow line. The variable indicator weights, for example, could resemble a triangle or a Gaussian. Neglecting the issues of when and where to initiate new flow lines, one could simply mark and count flow lines without marking any regions and then, afterwards, perform a smoothing operation, for example with a boxcar, a triangle or a Gaussian filter.

Instead of tracing flow lines all the way from left to right (and vice versa), flow lines can be computed for only a finite distance from the initiation point. This computation can be performed by line integral convolution or, preferably, a variation thereof that simply increments the counters of the samples touched by the stencil.

Generalizations of these flow line-based embodiments of confluence to three-dimensional data may be obtained by performing computations independently along inline and crossline directions or along a set of arbitrary directions. Alternatively, flow lines (curves) may be generalized to flow sheets (surfaces), or line integrals may be generalized to surface integrals.

Other embodiments of confluence can be obtained using seismic skeletons. The raw skeleton is represented by a directed graph of events (peaks, troughs, and zero crossings: vertices) and a waveform correlation with events in neighboring traces (edges). From a particular vertex (event), the graph can be traversed to the left and/or to the right by following the edges (correlations). Initiating graph traversals from different vertices allows counting how often any given vertex gets passed through. Either every vertex is used to initiate a traversal, or preferably, only vertices that have not been passed through yet are used to initiate a new traversal. In the preferred case, at first every vertex will initiate a traversal, but progressively, vertices will have been passed through at least once and initiation of new traversals will become increasingly rare. This particular graph-traversal embodiment of confluence can also be based on morphological skeletons.

Two other embodiments of confluence are based on the topological skeleton. First, one can count how many different surfaces overlay or underlay any given surface. If one surface below another particular surface terminates, then a new surface must exist below the original (non-terminating) one. The count of how many different surfaces are above and below a given surface therefore approximates the number of terminations against it. By their nature, large surfaces tend to have high counts. Normalizing the counts by surface size, however, tends to assign high relative counts to the tiniest surfaces, because a small number of counts is divided by a small area or the small number of samples forming the surface. Thus the counts need to be normalized. One normalization method involves using the surface area raised to some power, for example one half. A preferred normalization, however, is based on the analysis of the significance of encountering a certain number of terminations on a surface of a particular size. For a small surface, for example, there is a chance of encountering a large number of terminations relative to the surface size, and thus, this count may not be statistically significant. For a large surface, though, even a small termination count may be above average in a statistically significant manner. The termination probability of a surface can be estimated by averaging the individual relative termination counts, some weighted version thereof, or from the total number of surfaces divided by the total area of these surfaces. Once an expected termination probability (or density) is calculated, a binomial test can then be used to compute the statistical significance of a deviation from the expected number of terminations for a surface of a given size. For large surfaces, the binomial distribution is well approximated by convenient continuous distributions, and these can be used as the basis for alternative tests that are much quicker to compute, i.e., Pearson's chi-square test and the G-test. However, for small samples these approximations break down, and there is no alternative to the binomial test.

Another confluence embodiment derived from topological skeletonization is based on the age mapping volume associated with the surfaces. Areas of high confluence have a high density of flow lines or flow sheets. An isocontour or an isosurface in the age mapping volume is similar to a flow line or a sheet derived from reflection tangents. Thus, a high density of isosurfaces indicates an area of high confluence. A preferred alternative to the construction of isosurfaces and estimation of their density is the computation of a gradient or vertical derivative of the age mapping volume. Areas with high gradients or high derivatives have high confluence.

Any embodiments of confluence may further be smoothed by application of a long-distance smoother, for example a line convolution integral.

1.e Closure and Spill Points

Another set of geologic attributes, disclosed in U.S. Patent Application Publication No. 2010/0149917, "Method for Geophysical and Geological Interpretation of Seismic Volumes in Depth, Time, and Age" by Imhof et al., are enclosure and spill point. In traditional interpretation practices, a horizon is analyzed to determine the existence of closed contours encircling a topographic high spot, forming a closure, that could trap hydrocarbons. Note that closure can be implicit, for example where the contour lines terminate at a fault or against a salt dome and are implicitly assumed to follow these boundaries. For each closed contour, enclosure specifies the area contained within. Thus, any location on a surface can be analyzed to determine whether or not it lies on a closed contour encircling a high spot and, if so, the encircled area can be computed. For each high spot, its maximum enclosure specifies the maximum extent of the potential hydrocarbon trap.

Closures and enclosures can be determined for any single horizon or for any set of horizons, for example surfaces mapped by traditional means or by automated skeletonization. By estimating enclosure either for every surface in a dataset, from the age volume, or preferably from the depth volume, an enclosure volume can be computed that assigns every sample a value of zero if it is not part of a closed depth contour that encircles a high spot. Otherwise, the area of the encircled area is assigned to the sample location.

Using the age volume, a surface can be constructed by selection of an age, or a location, or some other criteria. This surface can be analyzed for high spots, contours that encircle the high spots, and their areas. Preferably however, the depth volume is used. Each horizontal slice in a depth volume represents a surface at some age. In fact, a depth volume is nothing more than a stack of surfaces ordered by age. For each slice (or surface of some age), its values correspond to depth and thus each slice constitutes a depth map. Each slice can be analyzed for high spots, closed contours, and enclosed areas, which allows computation of an enclosure volume in the age domain. If desired, the entire enclosure volume or a part thereof, a slice for example, can be easily transformed to the depth domain.

An extension of closure or enclosure volumes is spill points and spill point volumes. The spill point is a location near the maximum closure contour where the contours are breached and thus, the potential trap leaks (FIG. 1). Determination of all spill points allows creation of a spill point volume and examination of how different potential traps spill and feed each other. The locations and number of spill points can be used for risking a prospect or to guide a search for regions where hydrocarbons leaked from and accumulated to. Although spill points can be identified from age volumes by extraction of isoage surfaces and examination thereof, spill points and spill point volumes are preferably generated from depth volumes that correspond to stacks of depth maps of different age (i.e., stacks of depth maps for different horizons). If necessary, spill points and spill point volumes determined from depth volumes can be easily transformed to the depth domain by use of the depth volume as a lookup table or by interpolation.

1.f Phase Residues

Another geologic attribute can be formed from instantaneous phase anomalies, which point out locations where the seismic wavelet splits (PCT Patent Application Publication WO 2009/137150 A1, "Method For Geophysical And Stratigraphic Interpretation Using Waveform Anomalies" by Imhof). The instantaneous phase anomaly attribute is a discrete attribute indicating whether or not a wavelet split occurs at a sample location. Traditional convolution with a boxcar filter allows computation of a local density of wavelet splits. Long-distance structure oriented smoothing, for example with a line integral convolution, allows computation of density of wavelet splits that is consistent with the underlying seismic fabric. Preferably, the wavelet split loops and strings are first classified based on their shape and orientation to suppress wavelet splits caused by noise or artifacts.

Phase residues occur at locations where waveforms split, which implies that an additional reflection event commences or that one reflection merges into another one. In other words, a termination occurred. Terminations are often classified as onlap, downlap, toplap, and truncation (FIG. 9) depending on the relations between the reflections. Thus, phase residues may be classified as onlaps, downlaps, toplaps, and truncations. As an alternative to phase residues, terminations can also be detected and classified from seismic skeletons. Unless dip information is used, downlaps and onlaps cannot be distinguished and may need to be grouped together. Without dip information, toplap and truncation cannot be distinguished and need to be grouped together. Terminations and their classification can be posted on surfaces or confluence flowlines. Preferably, terminations and their classifications are converted to densities or geologic attributes by smoothing. Particularly useful geologic attributes based on terminations are termination densities such as the onlap/downlap density, the truncation/toplap density, or the difference between the onlap/downlap density and the truncation/toplap density that indicates which behavior dominates.

1.g Texture

Other geologic attributes are based on seismic texture. U.S. Pat. No. 6,438,493 B1, "Method for seismic facies interpretation using textural analysis and neural networks" to West and May discloses a method for the identification of seismic facies based on textural attributes computed with gray-level co-occurrence matrix (GLCM). Local textural attributes derived from GLCM include, but are not restricted to: textural homogeneity, inertia (also knows as the element-difference moment or contrast), entropy, and energy (also known as uniformity). Using long-distance smoothing along the fabric, these attributes can be converted to regional geologic attributes relating texture to seismic facies. The GLCM based texture attributes can further be generalized to three-dimensional texture attributes (e.g., U.S. Pat. No. 6,226,596 B1, "Method for analyzing and classifying three dimensional seismic information" to Gao).

Another texture attribute (PCT Patent Application Publication WO 2009/011735 "Geologic Features From Curvelet Based Seismic Attributes" by Neelamani and Converse) identifies stratigraphic features from seismic data by taking a curvelet transform of the data. From this curvelet representation, selected geophysical data attributes and their interdependencies are extracted and used to identify geologic features. Using long-distance smoothing along the fabric, these attributes can be converted to regional geologic attributes relating to texture and seismic facies.

Yet other texture attributes are based on windowed multidimensional Fourier measures (PCT Patent Application Publication WO 2010/053618, "Method for Seismic Interpretation Using Seismic Texture Attributes" by Imhof). One particular such measure is regularity, a texture attribute that measures how banded (or regular) seismic data appear to be. Areas with clean, through-going reflections exhibit a high degree of regularity while noisy areas with disorganized reflections exhibit low regularity. With small analysis windows, regularity is a discontinuity measure. With large analysis windows, regularity acts as a chaos measure. Thus, regularity can also be termed multitrace discontinuity chaos. Using long-distance smoothing along the fabric, these windowed multidimensional Fourier attributes can be converted to regional geologic attributes relating to texture and seismic facies. For example, through-going regional reflections, commonly termed railroad tracks, often correspond to transgressive surfaces (or flooding surfaces) that frequently form seals. Thus, long-distance smoothing of regularity (or its inverse, chaos) creates a geologic attribute related to hydrocarbon seals and, because shales both form seals and act as source rocks, hydrocarbon source rocks.

Randen and Sonneland ("Atlas of 3D Seismic Attributes", in *Mathematical Methods and Modeling in Hydrocarbon Exploration and Production*, Iske and Randen (editors), Springer, pages 23-46 (2005)) present an overview of additional three-dimensional seismic attributes that characterize seismic texture or seismo-stratigraphic features.

1.h WPCA Anomalies

Another family of attributes relevant to this invention is disclosed in PCT Patent Application Publication WO 2010/056424 "Windowed Statistical Analysis for Anomaly Detection in Geophysical Datasets" by Kumaran et al. These attributes highlight locations in one or multiple datasets where the seismic data are statistically anomalous compared to other locations. Moreover, these attributes generate a vector basis of patterns ranging from most common to most anomalous. Projecting the data onto a linear combination of these patterns emphasizes some patterns while suppressing others. For example, the ubiquitous seismic banding can be suppressed. Using long-distance smoothing along the fabric, the filtered seismic can be converted to regional geologic attributes. Another application is the local decomposition of the data into these patterns and determination of the dominant one, which effects classification of seismic samples based on the patterns of the surrounding samples. Using a long-distance median or mode filter along the fabric, the local class can be converted to a regional one.

1.i Other Attributes

Another kind of attribute is based on the inversion of multi-offset seismic data and the observed behavior of amplitude versus offset that allows prediction of porosity and clay content, and allows classification of the lithofacies (e.g., U.S. Pat. No. 7,424,367 B2 "Method for predicting lithology and porosity from seismic reflection data" to Saltzer et al.; "Seismic Rock-Property Inversion and Lithofacies Prediction at Erha Field, Nigeria", Xu et al., Nigerian Association of Petroleum Explorationists (NAPE) 2008 conference proceedings; "Lithofacies Prediction in Deep Water Water Reservoirs", Oppert et al., *Society of Exploration Geophysicists, Expanded Abstracts*, 1708-1711, (2006)). Using long-distance smoothing along the fabric, these attributes can be converted to regional geologic attributes relating to lithofacies, clay content, and porosity.

European Patent No. EP1110103 B1 "Method Of Seismic Signal Processing" to Meldahl et al. discloses a method to generate attributes that allows the detection of potential gas chimneys. A gas chimney is a vertical disturbance of the seismic response from gas seepage that degrades the seismic data due to limitations in acquisition and processing. The resulting chimney cube attribute highlights vertical disturbances of seismic signals that are often associated with gas chimneys. It reveals information of the hydrocarbon history and fluid flow. In other words, the chimney cube may reveal where hydrocarbons originated, how they migrated into a prospect and how they spilled from this prospect. As such, a chimney cube can be seen as a new indirect hydrocarbon indicator tool.

Moreover, Løseth et al. ("Hydrocarbon leakage interpreted on seismic data", *Marine and Petroleum Geology* 26(7), 1304-1319, (2009)) provide a review of seismic hydrocarbon leakage interpretation.

Lastly, seismic attributes can be related to properties in the subsurface that can be used to simulate transport phenomena such as heat flow and temperature which affect hydrocarbon maturation, or permeability and fluid flow which affect hydrocarbon migration (PCT Patent Application Publication WO 2009/137228 A2, "Transport Property Data Calculated From Derivative Seismic Rock Property Data For Transport Modeling" by Oppert et al.).

1.j Combination Attributes/Play Attributes

Figure 10:
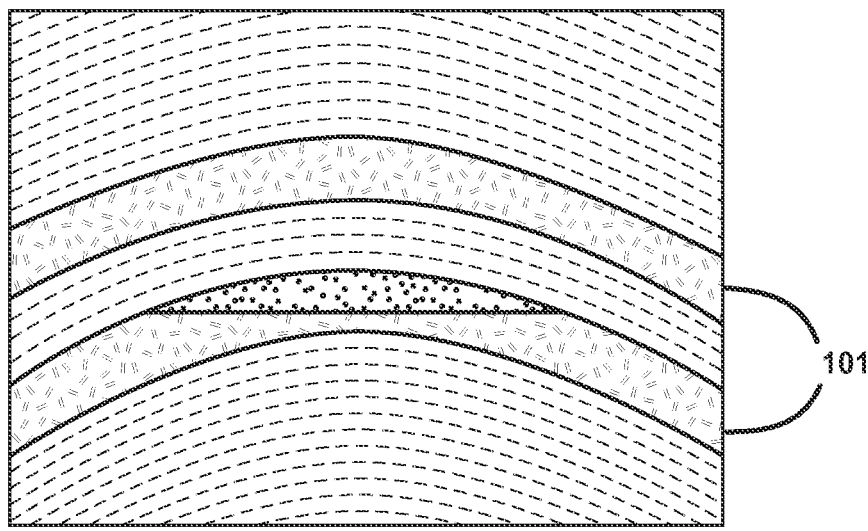
FIG. 10 depicts a fold-bounded (anticlinal) structural trap.
Figure 11:
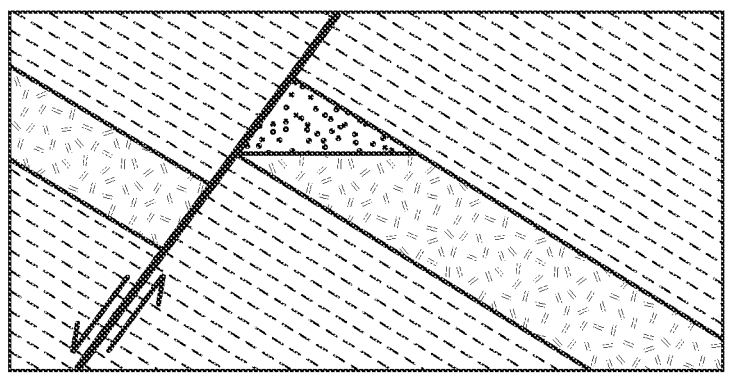
FIG. 11 depicts a fault related structural trap.

In some embodiments of the present inventive method, the seismic data are examined for one or multiple specific plays instead of elements of a more generic hydrocarbon system. Examples could include: anticlinal plays (FIG. 10), normal-fault plays (FIG. 11), salt-dome flank plays (FIG. 12), shoestring channel plays, or others, such as illustrated in FIGS. 13 to 16. In these cases, attributes, detectors or workflows are needed to distinguish specific features such as faults, salt, or channels.

PCT Patent Application Publication WO 2009/082545 "Detection of Features in Seismic Images" by Kumaran and Wang discloses one such method for the detection of channels or faults in seismic data. For fault detection, edges are identified in smoothed seismic images and the edge intensities are integrated in multiple directions, for example using the Radon transform to detect presence and orientation of fault lines. For channels, edges are detected and converted to smooth curves to identify channel edges. Sets of parallel smooth curves are then examined to find pairs of curves that correspond to left and right channel edges, thus defining the channel.

U.S. Pat. No. 7,203,342 B2, "Image Feature Extraction," to Pedersen discloses another such method designed for extracting faults from seismic attribute data, although it can also be used for other line or surface extraction problems as well. The method is based on ant tracking where numerical ants or agents roam over a discontinuity or edge-detection volume, slowly connecting up nearby pieces of aligned edges.

A last example is the detection of salt bodies using the regularity or chaos attributes disclosed in PCT Patent Application Publication WO 2010/053618 "Method for Seismic Interpretation Using Seismic Texture Attributes" by Imhof; or Randen and Sonneland, "Atlas of 3D Seismic Attributes" (in *Mathematical Methods and Modeling in Hydrocarbon Exploration and Production*, Iske and Randen (editors), Springer, pages 23-46 (2005)). These attributes highlight areas in the seismic data that appear chaotic with irregular texture, which often correspond to salt bodies.

These are just three example methods to identify specific features. Many others have been disclosed and are well known to practitioners of the art.

Partitioning

In order to detect the simultaneous presence of multiple proximal elements of the hydrocarbon system or multiple play elements, the data volume can optionally be partitioned into at least one segment for analysis, may be in conjunction with a background segment that is not analyzed. Typical modes of partitioning are analysis of: individual voxels, little blocks, fabric-aligned blocks, layers, or contiguous groups of voxels. The partitioning does not need to be mutually exclusive. Individual partitions may overlap.

The simplest partitioning is voxel-by-voxel analysis, but the results may be patchy because seldom are all elements recognized in the same voxel and one is unlikely to encounter an extended region of contiguous voxels with all elements present. Techniques such as smoothing the attributes or extending detected elements into surrounding voxels can be used in step 5 of the present inventive method (FIG. 2), evaluation, to create larger, contiguous prospects. Partitioning into voxels is a preferred partitioning method because the data are often already represented as voxels. For this reason, the partitioning step is considered optional. Moreover, partitions (and thus voxels) can be aggregated to larger regions during the evaluation step. Thus for the purpose of teaching the inventive method, if no partitioning has been performed explicitly, then each voxel is considered to form its own partition.

Another partitioning scheme involves breaking the data volume into regular Cartesian blocks or bricks, for example samples of size 20×20×20, where the expectation is that some or all elements are present within a prospective brick.

Cartesian bricks will cut through strata and fabric. An alternative to regular Cartesian bricks or blocks is to align blocks to the fabric. In this scheme, there will be differences in size and shape between the partitions because they conform to the fabric. A particular way of generating such a partitioning is by using the fabric itself to define a gross layer structure. Specifically, for example, a selection of surface pieces created by seismic skeletonization could be extended vertically to create bodies or segments.

Another preferred method for partitioning is based on one or multiple seismic attributes as generated, for example, in step 2. Partitions are created by thresholding of the attributes followed by connected component analysis or similar to generate contiguous regions embedded in a background. This process is also called (multivolume) seed detection. A preferred attribute to control the partitioning is saliency, an attribute that highlights locations in one or multiple datasets where the seismic data are statistically anomalous compared to other locations. Saliency attributes are disclosed in PCT Patent Application Publication WO 2010/056424 "Windowed Statistical Analysis for Anomaly Detection in Geophysical Datasets" by Kumaran et al. Saliency is a generic name for an attribute that highlights statistical anomalies in data. Kumaran et al. disclose "inverse covariance", "(WPCA) residue", or "(WPCA) anomaly," terminology for specific embodiments of saliency. Additional saliency attributes may be computed using Kumaran's methods. The saliency can be thresholded to perform the analysis only on contiguous anomalous regions.

An alternative method of using attributes to control partitioning is to first perform a different partitioning method, for example Cartesian blocks or fabric aligned bodies, and to then preserve only partitions where an attribute computed for each partition exceeds an absolute value or a relative value, or satisfies some prescribed condition, for example, where the maximum saliency is in the top quintile or where the average regularity falls within the range between 0.3 and 0.6.

A last example of a partitioning method involves subdividing the data volume into small regions that are ranked by an attribute(s), e.g., saliency. For many embodiments of the present invention, the order in which one evaluates the prospectivity of the different partitions or individual voxels does not matter. This last example demonstrates the use of an attribute such as saliency (or size, another attribute, or a combination of other attributes) to determine the order in which the partitions are analyzed. Using such a prioritization, it may not be necessary to analyze all partitioned regions. This embodiment of the present inventive method begins evaluation of the hydrocarbon system (step 5) with the most salient regions and continues with progressively less salient ones until a prescribed number of regions has been analyzed, a prescribed number of prospects has been found, or a prescribed time allowed for analysis has been exceeded.

Element Scores

Scoring may include normalization, conditioning, combining, or scaling. For some of the play or hydrocarbon system elements, this step takes at least one attribute per available element to form a score for every partition (or in the simplest case, for every voxel) that expresses the likelihood or expectation of a particular element being contained in a particular partition. Scoring is deemed an optional step because it can be performed as an explicit, separate step 4 as shown in the flowchart of FIG. 2. In some embodiments of the invention, however, it may be performed in combination with attribute formation (step 2) or prospect evaluation (step 5).

In the simplest form of the inventive method, an attribute is directly used as a score to indicate whether or not a particular element is present at any given location or not. Different attributes, however, can have different ranges for their values and it is often advantageous to normalize their values, for example between 0 and 1 or 0 to 255, for easier comparisons between attributes or to facilitate probabilistic interpretation. Normalization is just a linear transformation of the attribute values.

An alternative to normalization is calibration or the application of a nonlinear transformation of attribute values that is either driven by data, for example histogram equalization or histogram transformation, or driven by a model that expresses how an attribute relates to the likelihood for a given element to exist. Such a model may be based on theory, measurements, prior or contextual knowledge, experience, or intuition.

Seismic attributes are observations, measurements, or computations performed on seismic data. They may relate to hydrocarbon system elements or play elements, but often they do not actually measure these elements. Moreover, they may not be unique. Different attributes may relate to the same element. The same attribute may relate to multiple elements, while also affected by noise, acquisition, data processing, and the algorithm and parameters used to generate the attribute. The same type of attribute may be computed with different algorithms. Combination of attributes allows the formation of one score that indicates the likelihood or expectation for the presence of an element at a given location.

Figure 17:
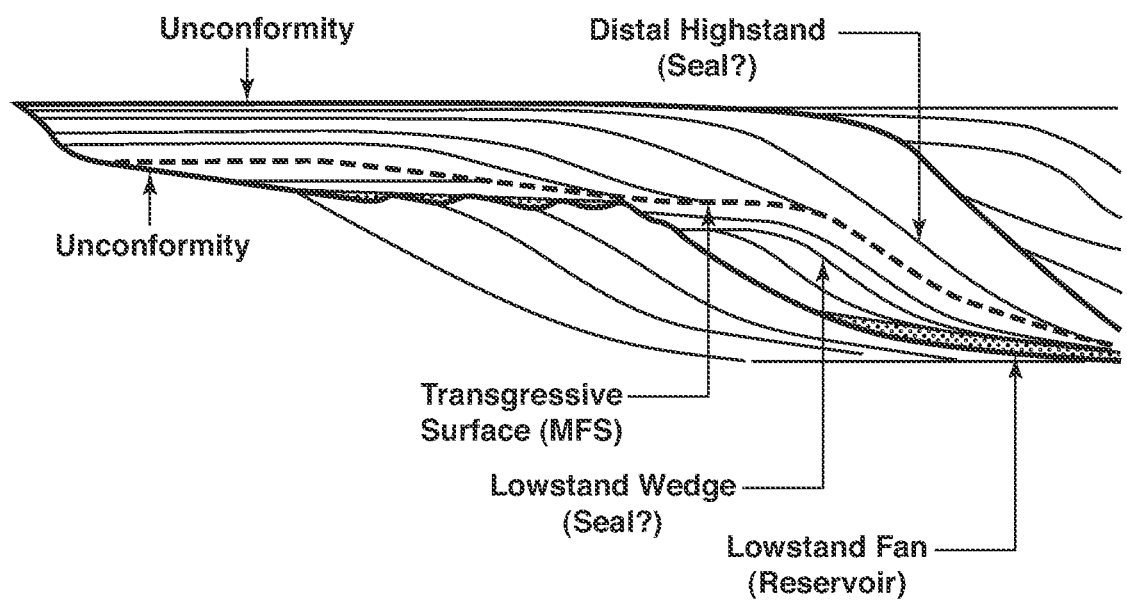
FIG. 17 presents a schematic depositional sequence model, i.e., slug diagram.

If for a given element, no direct attribute has been computed that defines a score, then the score may need to be defined indirectly using a proxy attribute or score, a heuristic, a concept, or a prior expectation (such as a constant value of 0.1 that simply indicates a 10% chance for the element). Reservoir, for example, may be directly indicated by a sand-shale ratio estimate and/or a porosity estimate. If no such indicator attribute exists, then a conceptual proxy, derived for example from sequence stratigraphic concepts, may need to be used. Such a proxy could be a combination of a lowstand basin floor fan that overlays an unconformity (a sequence boundary) as shown in FIG. 17. Lowstand basin floor fans often exhibit good porosity and permeability, and thus have the potential to form the reservoir element. Rising relative sea level will cover this fan with the toes of the lowstand wedge likely to consist of finer, less permeable matter that is capped by a transgressive surface. Further rise of relative sea level will bury the lowstand beneath the transgressive and highstand systems tracts. At distal locations, the fan may appear to be sandwiched between an "unconformity" and a "transgressive" surface. Thus, a rock body between an unconformity and a transgressive surface, located on the deep side of said unconformity, could be a lowstand fan and would therefore be assigned a high reservoir score.

Another aspect of score assignment is scaling to the segments or partitions. Many attributes are defined at every voxel location. Others may only be available on surfaces or at a few select locations. A particular partition may correspond to one voxel or to a contiguous set of voxels. In order to assign a score to every partition (or in the simplest case every voxel), attributes may need to be interpolated or reduced to obtain a single score per partition. For a partition that contains multiple samples, a representative score may be found by computation of the mean, the median, or the mode; application of a voting procedure; or selection of the minimum, maximum or a random sample value.

It is advantageous to augment the scores with a confidence. The score represents a likelihood of encountering a particular element at a given location. A score, however, does not indicate how credible this likelihood is. A location where a seismic attribute predicts high porosity may receive the same score as a location with a lowstand fan as suggested by proximity of an unconformity and a transgressive surface. But at the first location, there is a relatively direct measurement of porosity, and thus reservoir presence. At the second location, the existence of reservoir is postulated from a conceptual model. The direct measurement inspires higher confidence than a prediction based on a conceptual model. This difference is expressed in the confidence value associated with the score.

Prospect Evaluation

Using the scores for the play or hydrocarbon system elements allows evaluation of the partition (or voxel) prospects (step 5) and identification of their shortcomings, i.e., elements that are weakly expressed, lacking, or unresolved.

Many of the disclosed geologic attributes represent trends, and thus have a relatively low resolution. In some embodiments of the inventive system, the requirements for the spatial arrangement of elements, for example seal above reservoir, are relaxed and replaced with a test for the presence of all elements within a singular partition. This test for the presence of all elements is called a gated logic test because a partition has to pass the test for all of the elements in order to be deemed prospective. The gated logic approach of combining elements, therefore, is an "all or nothing" approach. Satisfying an element often means exceeding a score threshold that typically is specified by the interpreter or encoded in the system. Unsatisfied elements may be flagged for further examination because they constitute the weak links for a partition. Gated logic is a preferred embodiment of prospect evaluation.

A more gradual prospectivity test is a vote that simply counts how many elements are present in a given voxel or partition. The more elements present, the more a partition is deemed prospective. An element is either present or absent based on a comparison of its score against a threshold specified by the interpreter or encoded in the system. Absent or weakly expressed elements may be flagged. Voting is another preferred embodiment of prospect evaluation. A variation of voting is weighted voting where some elements are given a higher weight or more votes than others. Weighted voting could be used, for example, to emphasize elements that are detectable with higher confidence.

Combinations of gated logic with voting are possible, for example by requiring that a specified number of elements are present instead of requiring the presence of all elements. Another example is the required presence of some specified elements and the desired presence of others.

Prospect evaluation may include aspects of step 4, scoring. An example is the combination of different attributes, for example attributes computed with different algorithms or parameterizations, that relate to the same element(s). Instead of combining attributes first into scores for individual elements and then evaluating the prospect based on the scores, partition prospectivity can be evaluated directly from the different attributes, for example by voting or counting how many attributes exceed user or system-specified thresholds.

Hard thresholds can be avoided by use of a multi-valued logic, for example fuzzy logic that is derived from fuzzy set theory to deal with reasoning that is approximate rather than precise. Gated logic is crisp and binary, with membership values 0 and 1 representing below the threshold (element absent) and above the threshold (element present). Fuzzy logic scores, instead, have membership values that range from 0 to 1 and represent the degree of truth of a statement. Both degrees of truth and probabilities can range between 0 and 1 and hence may seem similar. However, they are conceptually distinct. Truth represents membership in vaguely defined sets, not likelihood of some event or condition as in probability theory. Take for example a stratigraphic layer that contains 70% silt and 30% shale. We may consider two concepts: reservoir and seal. The meaning of each of them can be represented by a certain fuzzy set. One might define the formation as being 0.7 reservoir and 0.3 seal. Note that the concept of reservoir would be subjective and thus would depend on the observer or designer. Another designer might equally well build a set membership function where the formation would be considered reservoir if the silt portion exceeds 50%. Fuzzy logic uses truth degrees as a mathematical model of the vagueness phenomenon while probability is a mathematical model of randomness. A probabilistic setting would first define a scalar variable for the silt fraction, and second define conditional distributions describing the probability that someone would call the formation a reservoir given a specific silt fraction. Note that the conditioning can be achieved by having a specific observer randomly select the label for the layer, a distribution over deterministic observers, or both. Consequently, probability has nothing in common with fuzziness; these are simply different concepts that superficially seem similar because of their usage of the same interval of real numbers between 0 and 1. Still, confusion arises because properties of random variables are analogous to properties of binary logic states and theorems such as De Morgan's, which relates the logical operators "AND" and "OR" in terms of each other via negation, have dual applicability.

Figure 18:
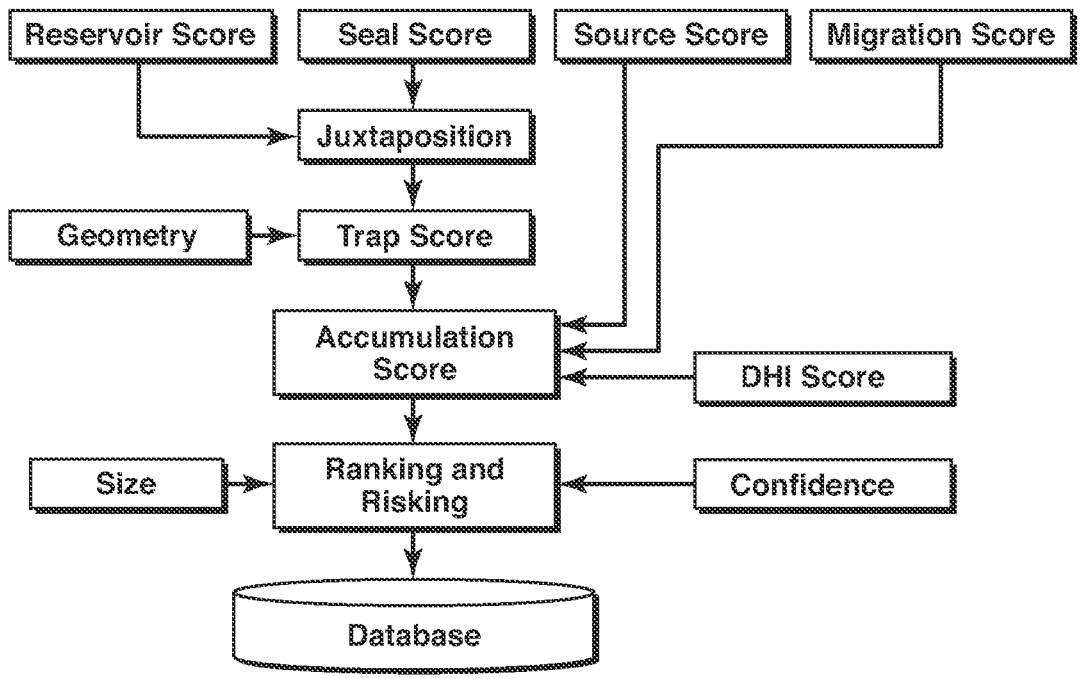
FIG. 18 illustrates how the different elements can be integrated to estimate the chance of success for a hydrocarbon accumulation.

An alternative to fuzzy logic is Bayesian logic which is based on Bayesian probability theory that enables reasoning with uncertain statements. To evaluate the probability of a hypothesis or configuration, a human or machine interpreter specifies some prior probability that is then updated in the light of new relevant data. The Bayesian interpretation provides a standard set of procedures and formulae to perform this calculation. One method to integrate the requirements for a particular configuration and to determine its likelihood is by use of a Bayesian Belief Network (BBN). A Bayesian network is a probabilistic graph-based model that represents a set of random variables and their conditional dependencies via a directed acyclic graph (DAG). This graph denotes the conditional independence structure between random variables, representing the different elements and their spatial arrangements. For example, a Bayesian network could represent the probabilistic relationships between play elements and play types. Given certain play elements, the network could be used to compute the likelihood of the presence of various play types. Formally, Bayesian networks are directed acyclic graphs whose nodes represent random variables in the Bayesian sense: they may be observable quantities, latent variables, unknown parameters or hypotheses. Edges represent conditional dependencies; nodes that are not connected represent variables that are conditionally independent of each other. FIG. 18 presents an example network graph for the entire hydrocarbon system. The scores for reservoir and seal are combined by analysis of their juxtaposition, which indicates whether the reservoir is capped by the seal. Given the local geometry, the reservoir/seal system is assigned a trap score Preferably, the trap is filled with hydrocarbons, and thus, the trap score is then combined with scores for presence of a source and indications of at least potential for migration pathways that lead from the source to the trap. Ideally, there is direct indication for hydrocarbons (DHI) in the seismic data as well. Therefore, the scores for trap, source, migration, and DHI are all combined to yield an accumulation score. All accumulation scores can now be weighted by size and confidence to risk and rank potential hydrocarbon targets.

Even when using geologic attributes that represent trends, partitions can be too small to contain all elements, for example when partitioning into individual voxels. Two approaches to test for coexistence or collocation within small partitions or between voxels are relative spatial shifts and extension of the influence regions. Shifting the scores spatially converts a test for a given spatial relationship into a test for collocation. For example, the seal score may be shifted downward relative to the reservoir score to examine the existence of seal over reservoir. Without application of such a shift, one needs to test for seal over reservoir. With application of such a shift, one can examine the collocated presence of seal and reservoir, for example with a gated logic. Instead of using a single shift, it may be advantageous to evaluate the coexistence of two scores for a range of shifts, giving preference to smaller shifts; for example, assign a higher confidence to smaller shifts to indicate closer proximity of the required elements or reduce prospectivity as a function of distance. Lateral shifts may be used to detect play elements such as faults next to reservoir. Instead of applying vertical or lateral shifts, shifts may be applied along the fabric or perpendicular to the fabric. Moreover, shifts can also be applied in arbitrary directions.

Shifting is inefficient if many different ranges and orientations or directions may need to be examined. A preferred alternative to shifting is extending the region of influence for raw or thresholded scores, for example by convolution or morphological dilation. In the former case, scores are smeared out or extended along specified directions, for example by convolution with a tapered directional filter that decays with increasing range, encoding the decrease in confidence. In one particular embodiment of influence region extension by convolution, the result of the convolution is added to the original score to form an updated score that is used for prospect evaluation. The extension direction is interpreter specified or determined from the fabric.

Raw or thresholded scores can be extended by directional morphological dilation which drags high scores along a specified direction into areas with lower scores. The direction may be specified by the interpreter, be encoded in the system, or be derived from the fabric. Morphological operations can be applied to raw or thresholded scores and arbitrary partitionings.

Figure 19:
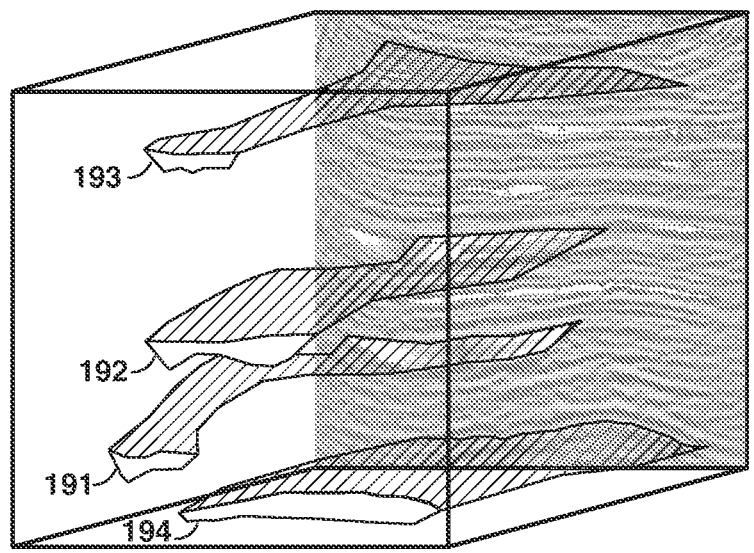
FIG. 19 shows a schematic application of ranking four potential targets.

FIG. 19 presents a schematic application of the inventive method to four partitions or potential target areas. Assuming that neither source score nor migration score can be determined from the given data, that no direct hydrocarbon indications are observed, and that the remaining elements are independent, the prospectivity for each target could be computed by multiplying confidence with size and the average of the reservoir, seal, and trap scores. Table 1 presents an example of this scoring process.

TABLE 1

Example ranking for the targets in FIG. 19 on size, confidence and the average scores for reservoir, seal, and trap.

| Target # | Size | Reservoir Score | Seal Score | Trap Score | Confidence | Total Score | Normalized Prospectivity |
|---|---|---|---|---|---|---|---|
| 191 | 13457 | 0.95 | 0.93 | 0.98 | 0.9 | 11546 | 100 |
| 192 | 19072 | 0.87 | 0.85 | 0.79 | 0.7 | 11169 | 96 |
| 193 | 15721 | 0.83 | 0.91 | 0.81 | 0.8 | 10690 | 92 |
| 194 | 18103 | 0.81 | 0.92 | 0.95 | 0.5 | 8086 | 70 |

Instead of representing the scores for each element with single values as used in the example of Table 1, the scores can be represented by distributions that capture the measured scores and their uncertainties and/or confidences. Highly certain scores associated with high confidence have a peaked distribution while less certain scores have a broad distribution. Scores that are needed but not measured by some attribute will have a uniform distribution. In some cases, the distributions may be propagated and combined through the system (FIG. 18). The scores could also be integrated in a Monte Carlo fashion where individual scores are randomly drawn from the corresponding distributions and propagated through the system. Repeating these steps many times over allows formation of subsequent distributions.

Analysis and Visualization

Analysis and visualization (step 6) is an optional step that may be combined with step 5, prospect evaluation. Analysis methods include: combination of neighboring partitions (repartitioning), ranking of prospects, validation of the primary prospects, analysis of secondary prospects, and weakest-link analysis.

Neighboring partitions may be combined to form larger, contiguous partitions. A prime example is the combination of single-voxel partitions into larger contiguous bodies, for example by connected component analysis or multivolume seed detection.

The invention may use millions of voxels or tens to thousands of partitions that contain at least some elements of the hydrocarbon system or at least some play elements. Preferably, the prospects where all elements are present are ranked in order to facilitate prospect validation. Preferably, partitions that present at least some elements are ranked in order to confirm or refute the missing ones. Ranking may be performed, for example, by size or confidence.

Large partitions that contain all elements are of primary interest for further evaluation because they represent prospects, i.e., areas in which the inventive system predicts the existence of hydrocarbons, and may ultimately be recommended for drilling. Justification for drilling a prospect will be made by further traditional analyses that are especially focused onto the lower confidence elements. Also of interest are partitions that lack the fewest number of elements, for example because of low confidence values. Such partitions may be analyzed with traditional methods to see whether they can be reclassified as prospects or not. In either case, further investigation is preferably focused onto the weakest link of a potential hydrocarbon system or prospect associated with a partition.

Prospectivity, confidence, scores, flagged elements, and attributes are typically stored in memory or on disk for further analysis and visualization.

Play Selection

In some embodiments of the inventive method, the data are examined not for generic hydrocarbon systems consisting of reservoir, trap, seal, etc., but for specific plays (for example a salt-flank play) that contain specific play elements. For a particular play to be considered, the interpreter needs to specify a configuration with the defining elements, their spatial relationships, and appropriate geologic attributes that relate to these specific elements.

Figure 12:
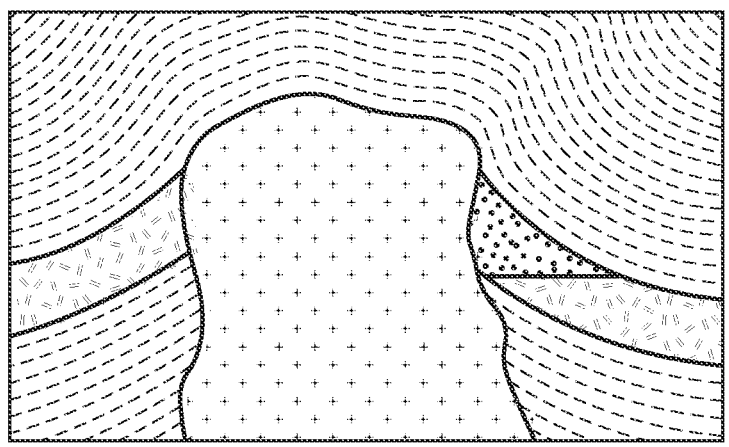
FIG. 12 shows a salt related structural trap.
Figure 13:
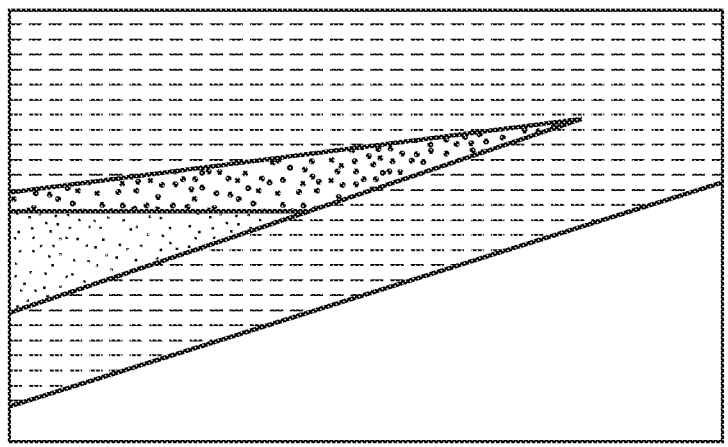
FIG. 13 illustrates a stratigraphic trap related to a pinchout of the reservoir.
Figure 14:
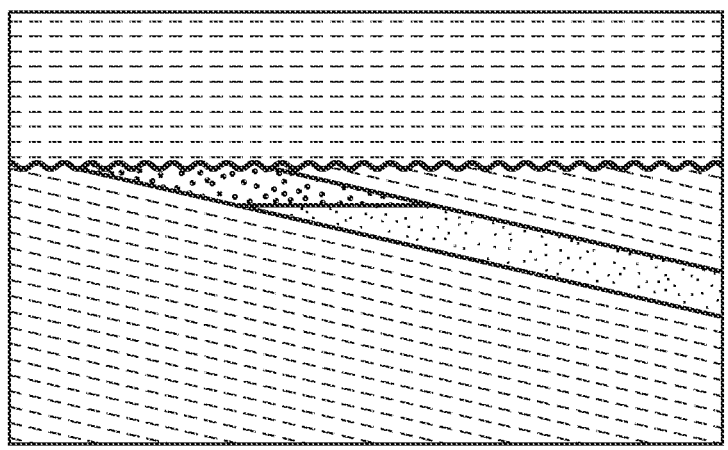
FIG. 14 shows a stratigraphic trap related to an unconformity.
Figure 15:
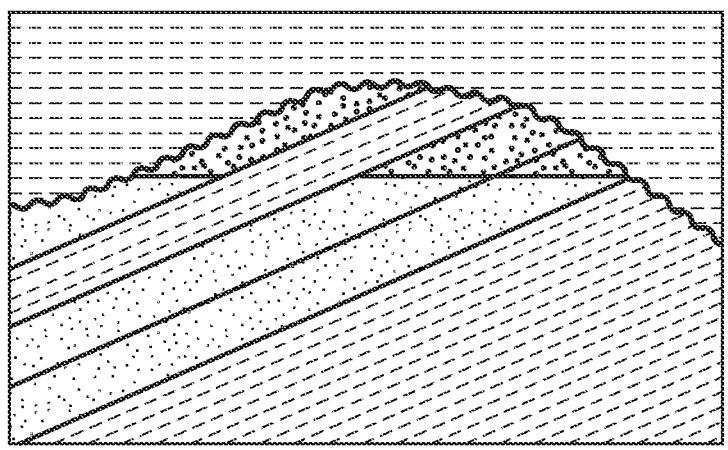
FIG. 15 depicts a stratigraphic trap formed by buried erosional relief.
Figure 16:
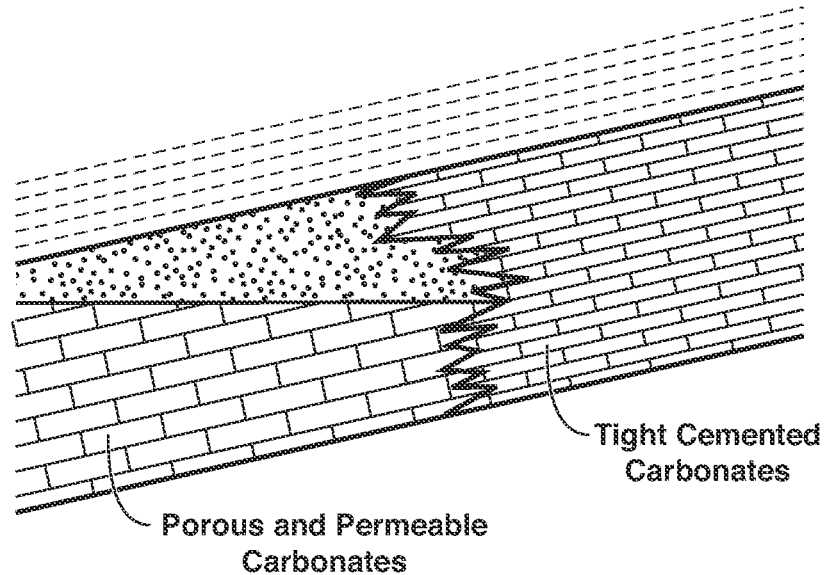
FIG. 16 depicts a stratigraphic trap formed by diagenetic differences.

FIGS. 10-16 depict some common plays. In all these figures, porous rocks (indicated at 101 in FIG. 10) constitute reservoirs that potentially contain hydrocarbons (indicated by dots). To prevent the hydrocarbons from escaping vertically, a seal is needed (indicated by dashes). A trap or trapping mechanism is needed to prevent hydrocarbons from escaping laterally. Structural plays are created by deformation of geologic strata, that include seal and reservoir formations, into geometries (or structures) that permit the accumulation of hydrocarbons. Such resulting geometries that involve reservoirs and seals are dominated by folds (FIG. 10), faults (FIG. 11), or salt diapirs (FIG. 12—where crosses mark the salt diapir). In stratigraphic plays, the trapping geometry is formed by variations in the rocks (or stratigraphy) that relate to their deposition. One example for stratigraphic plays is depicted in FIG. 13 where the reservoir formation, sand for example, pinches out into the sealing formation, shale for example. Other stratigraphic plays relate to erosion of reservoirs and formation of unconformities that are covered by sealing strata. FIG. 14 depicts a classical stratigraphic play where the strata above the unconformity (indicated by the heavy wiggly line) provide the seal for dipping reservoir formations that have been planed off by erosion. FIG. 15 depicts another stratigraphic play where the erosional relief in porous reservoir formations is buried beneath trapping seal formations. FIG. 16 depicts a configuration where the reservoir is formed by a porous limestone that is capped by a sealing shale formation. Lateral variations in diagenetic processes preserved the porosity in the reservoir but clogged the pore space in the updip direction, thus preventing the hydrocarbons from escaping laterally. The plays shown in FIGS. 10-16 are by no means exhaustive, but simply represent examples. Many other cases have been disclosed and are known to practitioners in the art (e.g., Hydrocarbon Traps, K. T. Biddle and C. C. Wielchowsky, *The Petroleum System—From Source to Trap*, AAPG Memoir 60, pages 219-235 (1994)).

For each play, its defining elements, their spatial relationships, and appropriate geologic attributes or scores need to be specified. For the anticlinal, fold-bounded play (FIG. 10), the minimal requirement is geometric in nature, namely the presence of strata with anticlinal structure resembling an upside-down cup. Preferably, there exists a reservoir formation with sufficient porosity and permeability to store and transmit fluids that is capped directly by a seal formation that is impermeable and forms a barrier to prevent these fluids from leaking. Ideally, there is a direct, geophysical indication of hydrocarbons or at least some indication of source rocks and fluid migration pathways into the trap.

For the fault bounded play (FIG. 11), the minimum requirements are also geometric in nature, namely the existence of strata dipping upward into a fault and the formation of a three-dimensionally closed reservoir compartment. If possible, one formation can be identified to constitute a reservoir, while another formation in close proximity above it is identifiable as a seal. Ideally, there exists a direct or indirect indication of hydrocarbons, a potential nearby source or fluid migration pathways.

A salt-flank play (FIG. 12) is defined by strata dipping upwards into a salt dome. A stratigraphic pinchout play (FIG. 13) requires an upward-dipping formation that tapers out. A stratigraphic unconformity trap (FIG. 14) requires at least dipping formations that are planed off by an unconformity. The stratigraphic play of buried erosional relief (FIG. 15) requires at least an unconformity with a three-dimensional arch shape. For all these configurations, additional criteria include: the presence of strata forming the reservoir capped by strata forming the seal, and the presence of a potential source, signs of fluid migration, or even direct indications of trapped hydrocarbons.

Schematics such as those depicted in FIGS. 10-16 are useful to develop, define, and communicate configurations. Prospective plays can be found and analyzed in an ad-hoc manner with either a custom-made specific workflow (or script) or interactively by an interpreter. Some embodiments of the inventive system may be based on one or multiple workflows that are mostly independent.

Preferably, specific plays and the attributes used to characterize its elements are stored in a configuration catalogue for reuse in similar situations.

Definition of a Configuration Catalogue

Instead of defining plays and their configuration for every application of the invention anew, it may be advantageous to create a catalogue or library of plays and configurations for repeated use. The interpreter or the system may then select one or multiple play types with their associated configurations from the catalogue. Drawing upon such a catalogue encourages reuse of configurations, promotes reproducibility, and facilitates validation. Moreover, the catalogue allows automated embodiments of the inventive system that compare the data or partitions against a potentially large set of configurations taken from the catalogue. It might even be desirable to have different embodiments of the same play in the catalogue to allow for variations in data quality, or expression of the play. In this case, the user of the invention could search for a salt-flank play by taking all salt-flank embodiments from the catalogue, perform the analysis using each, and use the best result from any given partition. The user could even run the entire catalogue over the partitions and then assign to every partition a play type according to the likelihoods.

For automated analysis, recognition, or comparison against a large set, or even the entire catalogue, configurations are preferably represented in a formal manner, rather than ad-hoc, for every configuration. An example is a graph representation for the configurations where vertices or nodes correspond to the required elements and state the preferred attributes while the graph edges mark their spatial relationships. Another representation of the catalogue entries is in the form of a relational database.

Advantages of using a more formal representation is reusability of the underlying components, rapid modification of existing configurations, swift addition of new configurations, and consistency between the results. Moreover, a more formal representation encourages stringent definition of spatial arrangement concepts such as above or next to. Lastly, the system can potentially be scaled up in a recursive manner.

A less formal but often preferred method of representing configurations in the catalogue is by assignment of weights to the geologic attributes. Each play configuration is characterized by the weights assigned to the associated geologic attributes or scores. Attributes or scores that are relevant to the particular elements are assigned a large weight, while irrelevant ones are assigned a low weight, zero for example. Required spatial relationships between the elements are captured by regions of influence or shifts assigned to the attributes or scores.

EXAMPLE

The example is based on a seismic data cube with a size of 1426 by 1057 by 131 samples (also called voxels). Three geologic attributes are computed: regularity, convergence, and enclosure. Regularity is computed with a relatively large window size of 61 by 41 by 41 samples. High regularity will demarcate planar strata, while low regularity will demarcate complex strata with either complicated structure or complicated stratigraphy with erosion, entrenchment and infill. Given the large window used for the computation of regularity, intermediate values of regularity correspond to transitions between planar and complex strata, i.e., to zones where planar and complex strata are juxtaposed. Preferably, therefore, association of planar strata with seals and complex strata with reservoirs leads to the identification of areas with intermediate regularity as those with potential seal-reservoir juxtaposition.

The second geologic attribute used in this example is convergence. No thinning in an area indicates that the strata are locally planar. High magnitudes of convergence or thinning indicate that strata are locally changing their thickness and that seismic surfaces are either converging or diverging. Convergence is oriented and thus a vector quantity, but the present example discards orientation or sign and only uses the magnitude of convergence. Areas with marked convergence potentially contain stratigraphic traps, for example by strata that pinch out (e.g., FIG. 13) or are beveled by an unconformity (e.g., FIG. 14). Thus, the convergence attribute differentiates potential areas of reservoir-trap coexistence.

The third geologic attribute used in this example is enclosure. Each voxel of the seismic volume is used as a seed point for the formation of a seismic surface that follows the seismic structure. The surface is examined to determine whether the seed point is located on a closed contour encircling a local high of the surface, or on either a closed contour encircling a local low spot or an open contour intersecting the volume boundary. In the first case, the point has closure, meaning that a buoyant fluid particle moving up from this location will potentially be caught in a trap. In the latter case, the buoyant particle may ascend along the surface and leave the volume without being trapped. Hence, the enclosure attribute delineates potential trap areas.

The three attributes used are not independent of each other. Intermediate values of regularity relate to seal and reservoir; high convergence relates to reservoir and trap; and enclosure only relates to trap. Instead of demixing them by formation of separate scores for seal, reservoir, and trap, the attributes are thresholded to form binary scores for the potential presence of seal-reservoir, reservoir-trap, and trap. Preferably, multiple attributes would be decomposed into separate scores for the different elements of the hydrocarbon system and/or trap configuration, for example by principle component analysis or clustering. But, given the custom application in conjunction with the gated all-or-nothing logic, the results from this preferable embodiment of the invention will be very similar at a much higher computational effort.

Figure 20:
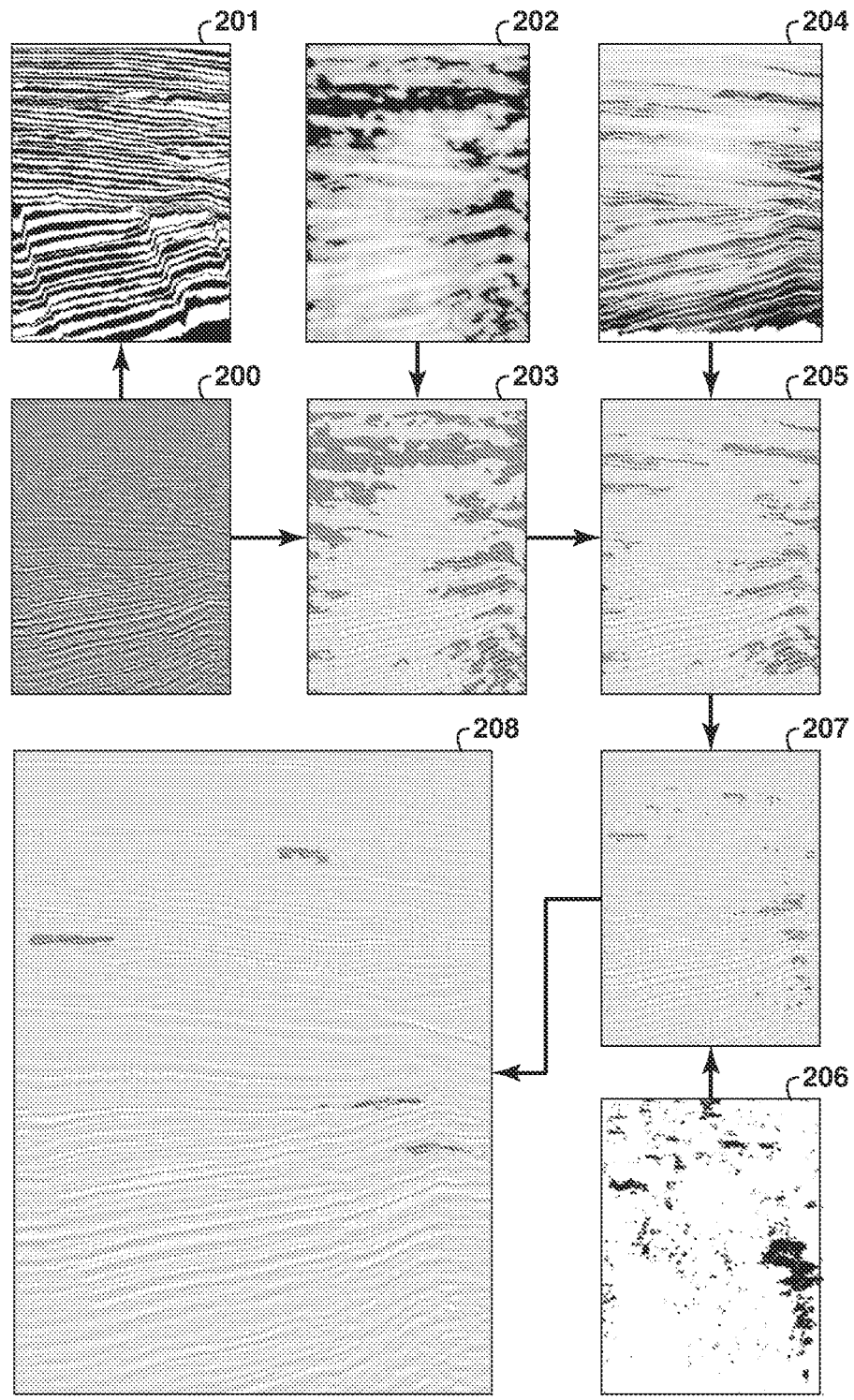
FIG. 20 illustrates an example application of the present inventive method.

The three defined conditions will be satisfied at different locations. To suppress small and often isolated areas, connected component labeling is performed over the intersection of the three scores to find larger, contiguous regions where samples of all three conditions are satisfied simultaneously. FIG. 20 presents a slice extracted from the three-dimensional data moving through the system. For illustrative purposes, the system is shown in a cascaded or serial mode, where the score of each attribute is used to sequentially chip away voxels lacking a particular aspect. Alternatively, the system could be implemented in a parallel mode by simultaneous intersection of all scores at once. 200 represents one slice of data out of 131 slices. The first step is computation of the fabric or structure which is performed by seismic horizon skeletonization, followed by construction of a depth mapping volume, 201, where zebra stripes are used to illustrate the detected fabric. The regularity attribute, 202, is computed and areas with low and high regularity are suppressed (light gray) while areas with intermediate regularity are emphasized (dark gray). These now-binary regularity scores are used to suppress seismic voxels with low or high regularity, 203. The seismic fabric, 201, is used to compute the convergence attribute, 204, that is converted to a score by thresholding. Suppressing seismic voxels with low convergence scores chips away more areas in the seismic data, 205. The seismic fabric, 201, is further used to compute the enclosure attribute, 206, which is then directly used as a score. Suppressing seismic voxels without enclosure chips away yet more areas in the seismic data, 207. Many voxels that score on all three criteria are either isolated or connected to very few similar ones. Thus, the final step is to consider the size of the remaining connected areas and suppress all but the largest ones, 208. In this example, only four regions remain, one of which is a known hydrocarbon reservoir.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in practical applications of the invention, at least some of the steps in the present inventive method are performed on or with the aid of a computer, i.e. the invention is computer implemented.

We claim:

1. A computer-implemented method for analyzing a volume composed of voxels of seismic data representing a subsurface region for presence of a hydrocarbon system or a particular play, comprising:
   partitioning the seismic data volume to form a plurality of segments;
   computing a prospectivity score for each voxel, wherein at least two elements are selected, and for each element at least one seismic attribute is selected, and then an element score is calculated for each selected element based on the selected at least one seismic attribute, and the prospectivity score is formed by combining the element scores;
   ranking the plurality of segments for presence of a hydrocarbon system or the particular play based at least partly on the prospectivity scores for the voxels of seismic data in each segment; and
   wherein the elements are selected from a group consisting of reservoir, seal, trap, source, charge, overburden, maturation, migration, accumulation, and timing, or juxtaposition or coexistence of any two or more of them.

2. The method of claim 1, wherein the partitioning comprises combining contiguous individual voxels based on a saliency attribute or a prospectivity score computed for each voxel.

3. The method of claim 2, wherein the saliency attribute is computed using either windowed principled component analysis or diffusion mapping applied to at least one seismic attribute.

4. The method of claim 1, wherein the elements are selected from a group consisting of reservoir, seal, trap, and charge.

5. The method of claim 1, wherein smoothing is applied to the at least two attributes, thereby generating geologic attributes, and the smoothing is applied over distances of at least ten seismic data voxels.

6. The method of claim 5, further comprising determining from the seismic data a layer structure, called a fabric, representative of the subsurface region, and wherein the smoothing to generate the geologic attributes comprises integrating or averaging the selected attributes along the fabric to prevent mixing from other strata.

7. The method of claim 6, wherein the smoothing along the fabric is performed by nonlinear, anisotropic diffusion filtering or by line integral convolution.

8. The method of claim 6, wherein the fabric is determined from seismic skeletonization.

9. The method of claim 5, wherein one of the at least two attributes relates to existence of a hydrocarbon trap, and the existence of a hydrocarbon trap is predicted by spatially correlating the geologic attributes and comparing to a catalog of hydrocarbon trap configurations.

10. The method of claim 1, wherein the at least two attributes comprise at least one of a group consisting of Hessian attributes; isocontour attributes; convergence; and confluence.

11. The method of claim 1, wherein the at least two attributes comprise at least one of a group consisting of enclosure and spill point; regularity; phase residues; texture; windowed principal component analysis anomalies; play attributes; terminations; termination densities; diffusion maps; and combinations thereof.

12. The method of claim 1, wherein the segments do not overlap each other.

13. The method of claim 1, wherein the segments are ranked based on a single score for each segment generated by combining the prospectivity scores for each voxel in the segment.

14. The method of claim 1, wherein each voxel of the seismic data volume is a separate segment.

15. The method of claim 1, wherein computed attribute values for different attributes are normalized to a common scale.

16. The method of claim 1, wherein determining the prospectivity score uses one of a group consisting of thresholds, fuzzy logic and Bayesian logic.

17. The method of claim 1, further comprising estimating a confidence value for at least one prospectivity score.

18. A method for producing hydrocarbons, comprising:
   conducting a seismic survey of a subsurface region;
   obtaining a prospectivity analysis of seismic data from the survey, wherein the analysis was conducted by a method described by claim 1, which is incorporated herein by reference; and
   drilling a well into the subsurface region based at least in part on the prospectivity analysis, and producing hydrocarbons from the well.

19. The method of claim 1, wherein the computing includes computing the prospectivity score based on an average of the element scores for the at least two elements.

20. A computer program product, comprising a computer usable non-transitory medium having a computer readable program code embedded thereon, said computer readable program code adapted to be executed to implement a method for analyzing seismic data representing a subsurface region for presence of a hydrocarbon system or a particular play, comprising:
   partitioning the seismic data volume to form a plurality of segments;
   computing a prospectivity score for each voxel, wherein at least two elements are selected, and for each element at least one seismic attribute is selected, and then an element score is calculated for each selected element based on the selected at least one seismic attribute, and the prospectivity score is formed by combining the element scores;
   ranking the plurality of segments for presence of a hydrocarbon system or the particular play based at least partly on prospectivity scores for the voxels of seismic data in each segment; and
   wherein the elements are selected from a group consisting of reservoir, seal, trap, source, charge, overburden, maturation, migration, accumulation, and timing, or juxtaposition or coexistence of any two or more of them.

* * * * *